（12） United States Patent
Jun et al.

(10) Patent No.: US 12,063,347 B2
(45) Date of Patent: Aug. 13, 2024

(54) SYSTEM FOR EVALUATING BUILT-IN VIDEO RECORDING DEVICE FOR VEHICLE

(71) Applicants: Hyundai Motor Company, Seoul (KR); Kia Corporation, Seoul (KR)

(72) Inventors: Sung Hwan Jun, Hwaseong-si (KR); Kyoung Jun Kim, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 358 days.

(21) Appl. No.: 17/579,695

(22) Filed: Jan. 20, 2022

(65) Prior Publication Data
US 2023/0009510 A1     Jan. 12, 2023

(30) Foreign Application Priority Data

Jul. 6, 2021   (KR) .................. 10-2021-0088691

(51) Int. Cl.
*G06F 3/041*      (2006.01)
*B25J 9/10*       (2006.01)
(Continued)

(52) U.S. Cl.
CPC ............ *H04N 17/002* (2013.01); *B25J 9/107* (2013.01); *B25J 15/0019* (2013.01); *G06F 3/0416* (2013.01); *G01M 7/02* (2013.01)

(58) Field of Classification Search
CPC ............... B60K 35/22; B60K 2360/11; B60K 2360/143; B60K 2360/21; B60R 11/04; B60W 50/14; B60W 2050/146; B60W 2420/403; G06F 3/044; G06F 3/0488; G06F 3/0416; G07C 5/0866; G07C 5/08;
(Continued)

(56) References Cited

U.S. PATENT DOCUMENTS

| 5,475,843 A * | 12/1995 | Halviatti ............ G06F 9/45512 |
| | | 719/329 |
| 5,725,352 A * | 3/1998 | Tanaka .................... B25J 9/107 |
| | | 414/744.5 |

(Continued)

FOREIGN PATENT DOCUMENTS

| CN | 105334037 A * | 2/2016 | ............ G01M 13/00 |
| CN | 113340611 A * | 9/2021 | |

(Continued)

OTHER PUBLICATIONS

Machine translation of CN-105334037-A (Year: 2017).*
Machine translation of CN-113340611-A (Year: 2003).*

*Primary Examiner* — David J Bolduc
(74) *Attorney, Agent, or Firm* — MCDONNELL BOEHNEN HULBERT & BERGHOFF LLP

(57) ABSTRACT

The present disclosure relates to a system for evaluating a built-in video recording device for a vehicle, the system including: a GUI (graphical user interface) test part configured to automatically perform evaluation of a GUI screen of a vehicle display device that operates in conjunction with the built-in video recording device for a vehicle; and an automatic evaluating part configured to automatically evaluate performance of the built-in video recording device for a vehicle based on a result evaluated by the GUI test part.

13 Claims, 21 Drawing Sheets

(51) Int. Cl.
*B25J 15/00* (2006.01)
*H04N 17/00* (2006.01)
*G01M 7/02* (2006.01)

(58) Field of Classification Search
CPC ....... H04N 17/002; H04N 17/06; B25J 9/107; B25J 15/0019; G01M 7/02
See application file for complete search history.

(56) References Cited

U.S. PATENT DOCUMENTS

| | | | |
|---|---|---|---|
| 7,390,041 B2 | 6/2008 | Horie | |
| 10,018,663 B2 | 7/2018 | Seong | |
| 2005/0275232 A1* | 12/2005 | Horie | B25J 7/00 294/86.4 |
| 2009/0265035 A1* | 10/2009 | Jenkinson | B25J 19/021 901/14 |
| 2012/0146956 A1* | 6/2012 | Jenkinson | G06F 3/0418 901/14 |
| 2014/0309775 A1* | 10/2014 | Jenkinson | G01L 25/00 700/250 |
| 2014/0350774 A1 | 11/2014 | Mouzakitis | |
| 2016/0187876 A1* | 6/2016 | Diperna | G05B 19/41875 702/81 |
| 2016/0192213 A1* | 6/2016 | Diperna | H04W 4/02 455/425 |
| 2016/0318187 A1 | 11/2016 | Tan | |
| 2016/0320889 A1* | 11/2016 | Jenkinson | B25J 11/00 |
| 2017/0024707 A1* | 1/2017 | Yang | G07F 17/0014 |
| 2017/0038419 A1 | 2/2017 | Seong | |
| 2018/0268378 A1* | 9/2018 | Liu | H04M 1/24 |
| 2019/0101988 A1* | 4/2019 | Kang | G06F 3/03547 |
| 2020/0003835 A1* | 1/2020 | Ahmad | G01R 31/31907 |
| 2020/0114504 A1* | 4/2020 | Chen | G10L 15/26 |
| 2020/0114522 A1* | 4/2020 | Chen | B25J 9/1697 |
| 2020/0240876 A1* | 7/2020 | Kim | H04R 29/004 |
| 2020/0344466 A1* | 10/2020 | Huang | G01S 13/931 |
| 2020/0384637 A1* | 12/2020 | Asada | B25J 9/1065 |
| 2021/0129326 A1* | 5/2021 | Do | B25J 9/1661 |
| 2021/0287460 A1* | 9/2021 | Aono | G07C 5/008 |
| 2021/0364567 A1* | 11/2021 | Kim | H04R 29/004 |
| 2022/0193890 A1* | 6/2022 | Castro | B25J 9/1065 |
| 2022/0234588 A1* | 7/2022 | Szelest | B60W 50/0205 |
| 2022/0284627 A1* | 9/2022 | Johnson | B60W 30/143 |
| 2022/0329779 A1* | 10/2022 | Jun | H04N 17/06 |

FOREIGN PATENT DOCUMENTS

| | | |
|---|---|---|
| JP | 2016014558 A | 1/2016 |
| KR | 1020130008248 A | 1/2013 |
| KR | 10-1703587 B1 | 2/2017 |

\* cited by examiner

SYSTEM FOR EVALUATING BUILT-IN VIDEO RECORDING DEVICE FOR VEHICLE

CROSS-REFERENCE TO RELATED APPLICATION

This application claims priority to and the benefit of Korean Patent Application No. 10-2021-0088691 filed in the Korean Intellectual Property Office on Jul. 6, 2021, the entire contents of which are incorporated herein by reference.

TECHNICAL FIELD

The present disclosure relates to a system for evaluating a built-in video recording device for a vehicle, and more particularly, to a system for automatically evaluating a built-in video recording device for a vehicle, which is capable of automating a process of evaluating performance of a built-in camera system for a vehicle and improving accuracy and reliability.

BACKGROUND

A built-in camera system is provided in a vehicle and serves as a built-in driving video recording device to record a driving or parking video of a vehicle. Such a built-in camera outputs video data in conjunction with an audio-video navigation (AVN) display device within the vehicle.

Conventionally, there was no automatic evaluation technique for a built-in camera system for a vehicle, and manual verification was performed based on all actual vehicles.

That is, conventionally, an output terminal of an actual vehicle controller was measured for electrical performance measurement, camera recording performance was simply checked in an actual vehicle environment for recording function evaluation, and a screen was evaluated by manually touching an actual vehicle-based AVNT (audio-video navigation terminal) display for GUI performance evaluation. In addition, in the related art, it was difficult to verify visibility depending on a license plate distance, and it was impossible to verify an influence of illumination/screen complexity.

As such, there is a problem in that work efficiency is lowered by manually verifying video recording and an AVNT GUI display function of the built-in camera system in the prior art. In particular, there was an evaluation deviation for each test person because quantitative evaluation was impossible as all GUI touch verification was performed manually.

In addition, in the related art, it was difficult to implement a verification environment for external environmental conditions (visibility by illumination/license plate distance) when checking the visibility of the license plate in the actual vehicle, so the evaluation of video quality and visibility of a camera recorded video of the video recording system was somewhat insufficient.

Therefore, recently, various studies have been conducted to automate the evaluation of the built-in camera system for a vehicle and improve accuracy, but the study results are still insufficient. Accordingly, there is a need to develop a technology to automate the evaluation of the built-in camera system for a vehicle and improve accuracy.

SUMMARY

The present disclosure has been made in an effort to provide a system for evaluating a built-in video recording device for a vehicle, which is capable of automating a process of evaluating performance of a built-in camera system for a vehicle and improving accuracy and reliability.

In particular, the present disclosure has been made in an effort to automatically verify a function of a built-in video recording device for a vehicle without an actual vehicle.

The objects to be achieved by the embodiments are not limited to the above-mentioned objects, but also include objects or effects that may be understood from the solutions or embodiments described below.

An exemplary embodiment of the present disclosure provides a system for evaluating a built-in video recording device for a vehicle, the system including: a GUI (graphical user interface) test part configured to automatically perform evaluation of a GUI screen of a vehicle display device that operates in conjunction with the built-in video recording device for a vehicle; and an automatic evaluating part configured to automatically evaluate performance of the built-in video recording device for a vehicle based on a result evaluated by the GUI test part.

According to the exemplary embodiment of the present disclosure, the GUI test part may include: a GUI test chamber having an accommodation space therein; a mount disposed in the GUI test chamber and configured to support the vehicle display device; an articulated robot disposed in the GUI test chamber; and an electrostatic touch unit connected to the articulated robot so as to be movable by the articulated robot and configured to electrostatically touch the GUI screen.

According to the exemplary embodiment of the present disclosure, the electrostatic touch unit may include: a first touch tip configured to come into contact with the GUI screen; a second touch tip configured to come into contact with the GUI screen separately from the first touch tip; and a movement unit configured to selectively move the first touch tip and the second touch tip in a direction in which the first and second touch tips approach or move away from each other.

According to the exemplary embodiment of the present disclosure, the movement unit may be configured to rectilinearly move between a first position at which the first and second touch tips are adjacent to each other and a second position at which the first and second touch tips are spaced apart from each other.

According to the exemplary embodiment of the present disclosure, the movement unit may include: a base part; a driving source disposed on the base part; a rectilinearly movable member configured to be rectilinearly moved by the driving source; a first link part connected to the first touch tip and configured to be selectively unfolded and folded in conjunction with the rectilinear movement of the rectilinearly movable member to rectilinearly move the first touch tip relative to the second touch tip; and a second link part connected to the second touch tip and configured to be selectively unfolded and folded in conjunction with the rectilinear movement of the rectilinearly movable member to rectilinearly move the second touch tip relative to the first touch tip.

According to the exemplary embodiment of the present disclosure, the first link part may include: a first idle link member rotatably connected to the base part; a first driving link member rotatably coupled to the first idle link member so as to intersect the first idle link member and having one end rotatably connected to the rectilinearly movable member; and a first support link member connected to any one of the first idle link member and the first driving link member and configured to support the first touch tip, and the second link part may include: a second idle link member rotatably connected to the base part; a second driving link member rotatably coupled to the second idle link member so as to intersect the second idle link member and having one end rotatably connected to the rectilinearly movable member; and a second support link member connected to any one of the second idle link member and the second driving link member and configured to support the second touch tip.

According to the exemplary embodiment of the present disclosure, the first link part may further include a first connection link member having one end connected to the other of the first idle link member and the first driving link member, and the other end connected to the first support link member, and the second link part may further include a second connection link member having one end connected to the other of the second idle link member and the second driving link member, and the other end connected to the second support link member.

According to the exemplary embodiment of the present disclosure, the system for evaluating a built-in video recording device for a vehicle may include: a sliding rail provided on the base part and disposed in a rectilinear movement direction of the rectilinearly movable member; and a sliding member connected to the rectilinearly movable member and configured to slide along the sliding rail, and one end of the first driving link member may be rotatably connected to the sliding member, and one end of the second driving link member may be rotatably connected to the sliding member.

According to the exemplary embodiment of the present disclosure, the system for evaluating a built-in video recording device for a vehicle may include a GUI test camera connected to the articulated robot and configured to capture an image of the GUI screen.

According to the exemplary embodiment of the present disclosure, the system for evaluating a built-in video recording device for a vehicle may include: a seating bed disposed in the GUI test chamber and configured to allow the vehicle display device to be seated thereon; and a vibrator disposed in the GUI test chamber and configured to selectively apply vibration to the seating bed.

According to the exemplary embodiment of the present disclosure, the vibrator may include: a vibration motor disposed in the GUI test chamber; a rotary member configured to be rotated by the vibration motor; and a conversion member having one end rotatably connected to the rotary member and spaced apart from a rotation center of the rotary member, and the other end rotatably connected to the seating bed, the conversion member being configured to convert a rotation of the rotary member into a reciprocating rectilinear movement of the seating bed.

According to the exemplary embodiment of the present disclosure, the system for evaluating a built-in video recording device for a vehicle may include a guide rail disposed in the GUI test chamber, the seating bed may be configured to reciprocatingly and rectilinearly move along the guide rail.

According to the exemplary embodiment of the present disclosure, the system for evaluating a built-in video recording device for a vehicle may include a cover member disposed in the GUI test chamber and configured to cover the vibrator.

According to the exemplary embodiment of the present disclosure, the system for evaluating a built-in video recording device for a vehicle may include a clamp disposed on the seating bed and configured to selectively lock the vehicle display device to the seating bed.

According to the exemplary embodiment of the present disclosure, the clamp may include: a first clamping member disposed on the seating bed; and a second clamping member disposed on the seating bed and configured to approach and move away from the first clamping member, and the vehicle display device may be locked between the first clamping member and the second clamping member.

According to the exemplary embodiment of the present disclosure, the system for evaluating a built-in video recording device for a vehicle may include: a camera test part configured to evaluate performance of a front camera of the vehicle or performance of a rear camera of the vehicle, and the automatic evaluating part may automatically evaluate performance of the built-in video recording device for a vehicle in cooperation with the camera test part.

According to the exemplary embodiment of the present disclosure, the camera test part may include: a camera test chamber having an accommodation space therein; a camera mount disposed in the camera test chamber and configured to support the front camera or the rear camera; an inner display part disposed inside the camera test chamber and configured to output video data; and an outer display part disposed outside the camera test chamber and configured to output the video data.

According to the exemplary embodiment of the present disclosure, the camera mount may include: a mount main body; a tilting mount configured to be tilted with respect to the mount main body; and a camera clamp disposed on the tilting mount and configured to selectively lock the front camera or the rear camera.

According to the exemplary embodiment of the present disclosure, the system for evaluating a built-in video recording device for a vehicle may include a tilting stage configured to be tilted with respect to the tilting mount, and the camera clamp may be disposed on the tilting stage.

According to the exemplary embodiment of the present disclosure, the system for evaluating a built-in video recording device for a vehicle may include a comparative camera clamp connected to the mount main body and configured to support a comparative camera.

According to the embodiment of the present disclosure described above, it is possible to obtain an advantageous effect of automating the evaluation of the performance of the built-in camera system for a vehicle and improving accuracy and reliability.

In particular, according to the embodiment of the present disclosure, the performance of the built-in video recording device for a vehicle may be automatically evaluated without an actual vehicle, the performance verification may be performed depending on external environmental conditions (illuminance/visibility for each license plate distance), and the accurate evaluation may be performed without an evaluation deviation. Therefore, it is possible to obtain an advantageous effect of improving reliability of the built-in video recording device for a vehicle.

In addition, various effects that can be directly or indirectly identified through this document may be provided.

DETAILED DESCRIPTION

Figure 1:
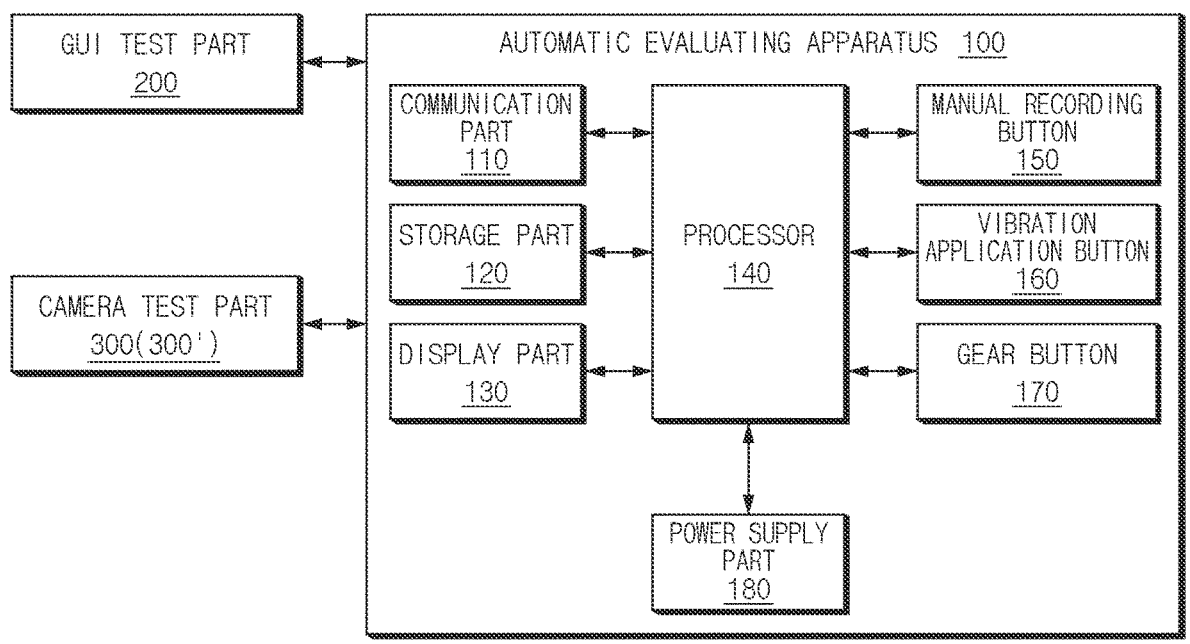
FIG. 1 is a view illustrating a system for evaluating a built-in video recording device for a vehicle according to an embodiment of the present disclosure.
Figure 2:
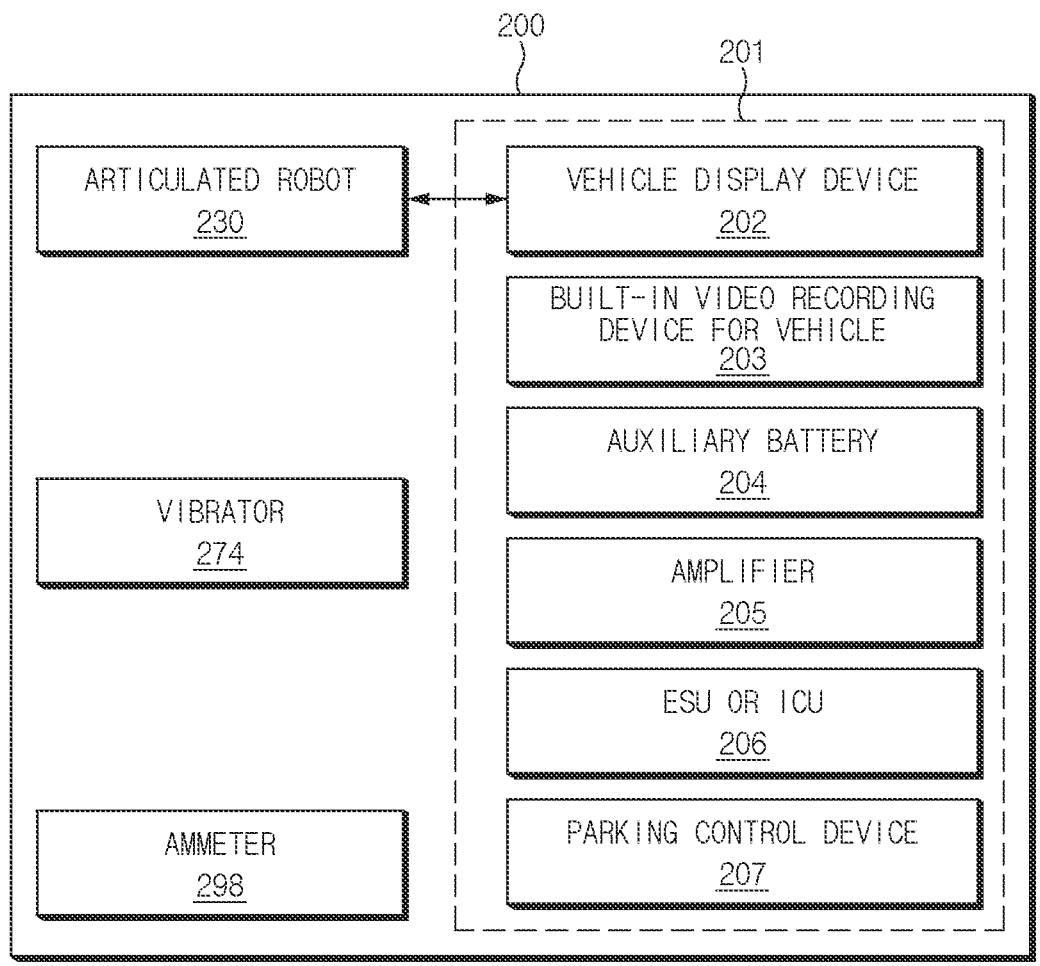
FIG. 2 is a view illustrating a GUI test part of the system for evaluating a built-in video recording device for a vehicle according to the embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 21, a system 10 for evaluating a built-in video recording device for a vehicle according to the embodiment of the present disclosure may include an automatic evaluating part 100, a GUI test part 200, camera test parts 300, 300', and the like.

According to the exemplary embodiment of the present disclosure, the GUI test part 200 automatically performs evaluation of a GUI screen 202a of a vehicle display device 202 that operates in conjunction with a built-in video recording device 203 for a vehicle. The automatic evaluating part 100 automatically evaluates performance of the built-in video recording device 203 for a vehicle based on the result evaluated by the GUI test part 200.

The automatic evaluating part 100 may automatically evaluate performance of the built-in video recording device 203 for a vehicle that operates in conjunction with the vehicle display device 202. The automatic evaluating part 100 may perform evaluation by automating various test conditions that are difficult to check in an actual vehicle during evaluation of a built-in camera in the related art so as to perform quantitative evaluation compared to the related art. Particularly, more quantitative and efficient evaluation is possible by replacing a GUI touch evaluation part, which requires a lot of effort by an evaluator, with an automatic evaluation method applying an articulated robot 230 (e.g., a robot arm).

To this end, the automatic evaluating part 100 according to the embodiment of the present disclosure may interwork with sample devices such as the vehicle display device 202, a front camera FC, a rear camera RC, an ESU or ICU 206, and a parking control device 207 implemented inside a vehicle so as to evaluate whether the built-in video recording device 203 (e.g., the built-in camera) for a vehicle is malfunctioning.

For reference, the built-in video recording device 203 for a vehicle a video recording device (a drive video record system (DVRS)), a built-in camera system, and the like, and may interwork with an audio-video navigation (AVN) and a smartphone in the vehicle so as to perform front and rear high-definition recording, recording while parking (when an auxiliary battery is installed), impact detection, and the like.

Referring to FIG. 1, the automatic evaluating part 100 may include a communication part 110, a storage part 120, a display part 130, a processor 140, a manual recording button 150, a vibration application button 160, a gear button 170, and a power supply part 180.

The communication part 110, which is a hardware device implemented with various electronic circuits to transmit and receive signals through wireless or wired connection, may communicate with the GUI test part 200, the camera test parts 300, 300', and the like. Particularly, the communication part 110 may communicate with the sample devices such as the vehicle display device 202, the front camera FC, the rear camera RC, the ESU or ICU 206, the parking control device 207, and the like.

The communication part 110 may perform low voltage differential signaling (LVDS) communication or Ethernet communication and implement an in-vehicle network communication technique. As an example, the in-vehicle network communication techniques may include controller area network (CAN) communication, local interconnect network (LIN) communication, flex-ray communication, and the like.

The storage part 120 may store data and/or algorithms required for the processor 140 to operate. In particular, the storage part 120 may store a learning algorithm for learning the determination criteria in advance for automatic evaluation. For example, the storage part 120 may store pre-learned determination criteria for automatic evaluation.

The storage part 120 may include a storage medium of at least one type among memories of types such as a flash memory, a hard disk, a micro memory, a card (e.g., a secure digital (SD) card or an extreme digital (XD) card) memory, a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The display part 130 may include an input means for receiving a control command from a user and an output means for outputting an operation state of the device and results thereof.

In this case, the input means may include a key button. The input means may further include a keyboard, a mouse, a joystick, a jog shuttle, a stylus pen, and the like. In addition, the input means may further include a soft key implemented on a display.

The output means may include a display. The output means may further include a voice output means such as a speaker.

For example, when a touch sensor formed of a touch film, a touch sheet, or a touch pad is provided on the display, the display may operate as a touch screen and be implemented in a form in which the input means and the output means are integrated. In the embodiment of the present disclosure, the output means may output a screen indicating an automatic evaluation result of the built-in video recording device 203 for a vehicle. For example, the output means may be implemented as a monitor illustrated in FIG. 18.

For reference, the display may include at least one of a liquid crystal display (LCD), a thin film transistor liquid crystal display (TFT LCD), an organic light-emitting diode display (OLED display), a flexible display, a field emission display (FED), and a 3D display.

The processor 140 may be electrically connected to the communication part 110, the storage part 120, the display part 130, the manual recording button 150, the vibration application button 160, the gear button 170, the power supply part 180, and the like. The processor 140 may electrically control the components. The processor 140 may be an electrical circuit that executes software commands, thereby performing various data processing and calculations described below.

The processor 140 may process a signal transferred between the components of the automatic evaluating part 100 and perform overall control such that each of the components can perform its function normally.

The processor 140 may be implemented in the form of hardware, software, or a combination of hardware and software. Particularly, the processor 140 may be implemented as microprocessor.

The processor 140 may automatically evaluate the performance of the built-in video recording device 203 (e.g., the built-in camera) for a vehicle that interworks with the vehicle display device 202 (e.g., the AVNT).

The processor 140 may automatically evaluate at least one of GUI verification, basic performance verification, recording quality verification, electrical performance verification, abnormal mode verification, and communication performance verification of a video of the built-in video recording device 203 for a vehicle. The basic performance verification may include at least one of booting time evaluation, front and rear time deviation evaluation, emergency download function evaluation, recorded file consistency evaluation, frame per second (FPS) performance evaluation, and mode evaluation before and after customer delivery. These performance verification items will be described in more detail below with reference to FIGS. 19 and 20.

The processor 140 may perform GUI evaluation by automatically touching the GUI screen 202a of the vehicle display device that outputs a video of the built-in video recording device 203 for a vehicle by controlling the articulated robot 230 (the robot arm). The processor 140 may select a GUI test scenario depending on an initial user setting, store it in the storage part 120, and automatically repeat it.

The processor 140 may generate virtual touch coordinate information and transmit it to the built-in video recording device 203 for a vehicle to automatically evaluate a GUI video transferred by the built-in video recording device 203 for a vehicle.

The processor 140 may automatically determine suitability of a video by branching the video transmitted by the built-in video recording device 203 for a vehicle to the vehicle display device 202.

The processor 140 may verify a booting time from a power-off state of the built-in video recording device 203 for a vehicle to a point of time when a recording operation is possible when power is applied under at least one voltage condition. In this case, at least one voltage condition may be set by a combination of parking recording setting, parking recording non-setting, and remote starting condition.

The processor 140 may automatically evaluate a deviation between a video of the front camera FC and a video of the rear camera RC for each of a plurality of recording modes. For example, the plurality of recording modes may include at least one of a regular driving mode, a driving impact mode, a manual driving mode, a regular parking mode, a parking impact mode, and a manual parking recording mode.

The processor 140 may evaluate whether a video stored in the built-in video recording device 203 for a vehicle is automatically downloaded and may determine suitability of an automatically generated log text file.

The processor 140 may verify suitability of a capacity by extracting capacity information of a recorded video after performing recording at a maximum capacity for each of the plurality of recording modes.

The processor 140 may perform frame per second (FPS) verification by playing each recorded file after recording all videos for each of the plurality of recording modes in a full memory.

The processor 140 may output a license plate to the display panel to gradually reduce a size from an actual criterion size of the license plate, and may estimate a distance to an actual vehicle, to automatically verify license plate visibility for each estimated distance between the illuminance and the actual vehicle.

The processor 140 automatically determines whether the built-in video recording device 203 for a vehicle performs normal recording under an abnormal power condition in conjunction with the power supply part 180.

The processor 140 may automatically extract a recorded file list and automatically determine whether the file is appropriate and whether a file magnitude and a file name are appropriate based on meta data.

The manual recording button 150 allows a user to manually input a recording command of the built-in camera.

For example, the vibration application button 160 allows the user to manually apply an impact to the built-in camera. Accordingly, the automatic evaluating part 100 may verify a recording function upon impact and preset impact strength and impact level.

Further, the gear button 170 may be configured to manually determine a shift stage of the vehicle.

In addition, the power supply part 180, which is a power supply, may supply power to the built-in video recording device 203 for a vehicle.

Referring to FIGS. 1 to 13, the GUI test part 200 is configured to automatically perform the evaluation of the GUI screen 202*a* of the vehicle display device 202 that operates in conjunction with the built-in video recording device 203 for a vehicle.

The GUI test part 200 may have various structures capable of performing the evaluation of the GUI screen 202*a*. The present disclosure is not restricted or limited by the structure of the GUI test part 200.

For example, the GUI test part 200 may include a GUI test chamber 210 having an accommodation space therein, a mount 220 disposed in the GUI test chamber 210 and configured to support the vehicle display device 202, the articulated robot 230 disposed in the GUI test chamber 210, and an electrostatic touch unit 240 connected to the articulated robot 230 so as to be movable by the articulated robot 230 and configured to electrostatically touch the GUI screen 202*a*.

The GUI test chamber 210 may have various structures having the accommodation space therein.

Figure 3:
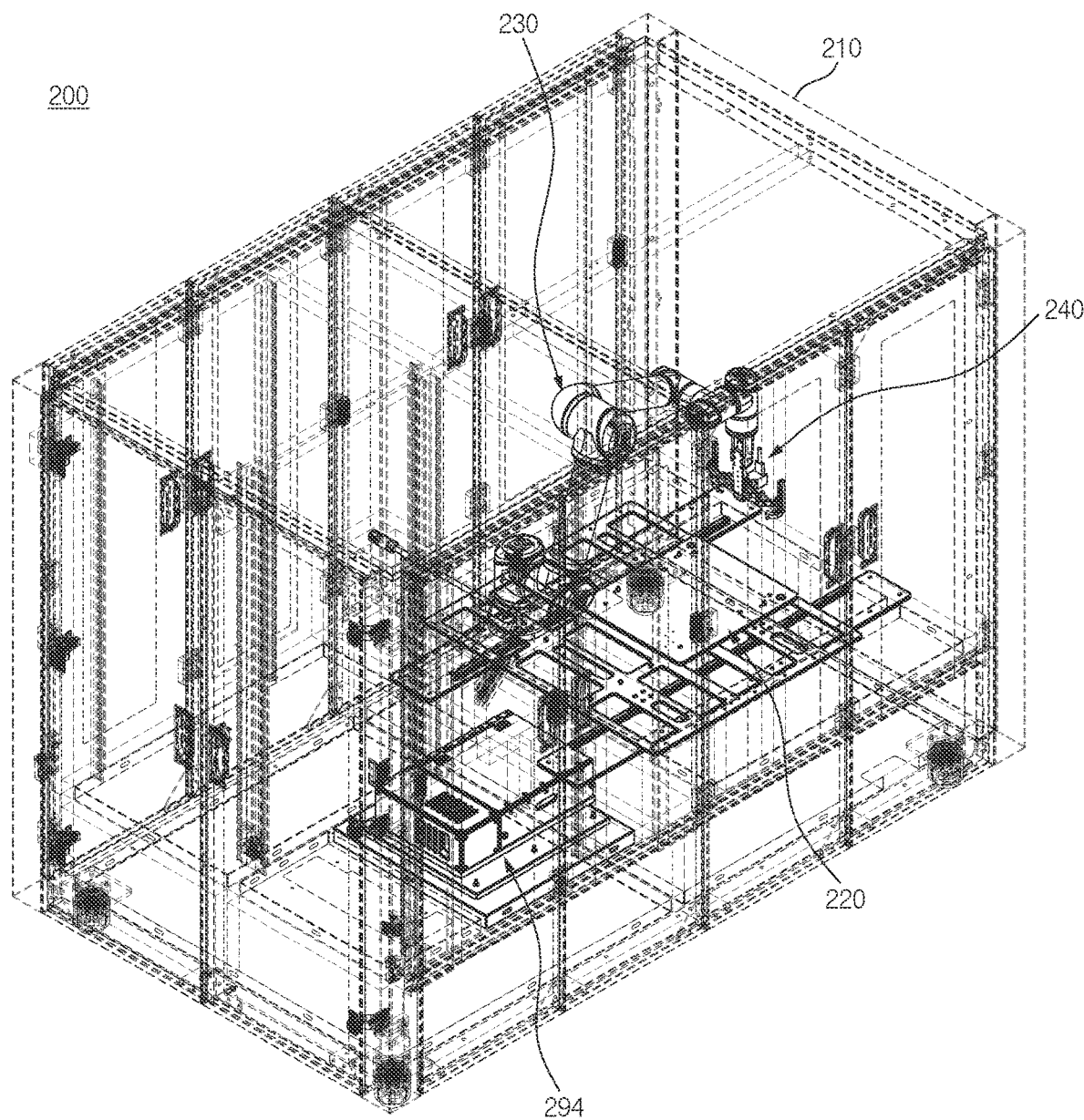
FIG. 3 is a view illustrating a GUI test chamber of the system for evaluating a built-in video recording device for a vehicle according to the embodiment of the present disclosure.
Figure 4:
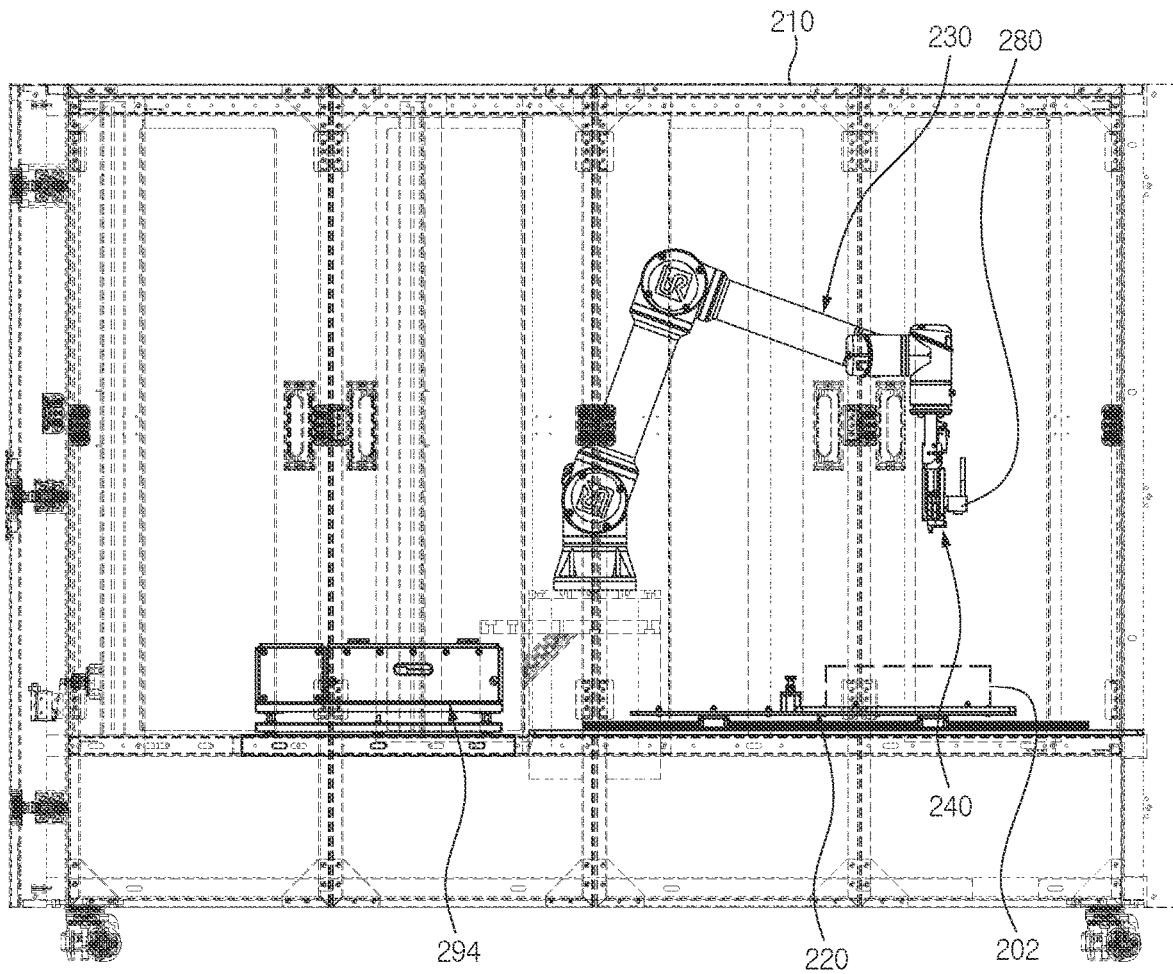
FIG. 4 is a view illustrating an articulated robot of the system for evaluating a built-in video recording device for a vehicle according to the embodiment of the present disclosure.

For example, referring to FIG. 3, the GUI test chamber 210 may be provided in the form of a quadrangular box having the accommodation space therein.

Further, a door (not illustrated) may be disposed at a lateral side of the GUI test chamber 210 and open or close an entrance or exit (not illustrated) through which the vehicle display device 202 enters or exits the GUI test chamber 210.

The mount 220 is disposed in the GUI test chamber 210 to support the vehicle display device 202 (e.g., an AVNT display).

The mount 220 may have various structures capable of supporting the vehicle display device 202. The present disclosure is not restricted or limited by the structure and shape of the mount 220.

Figure 5:
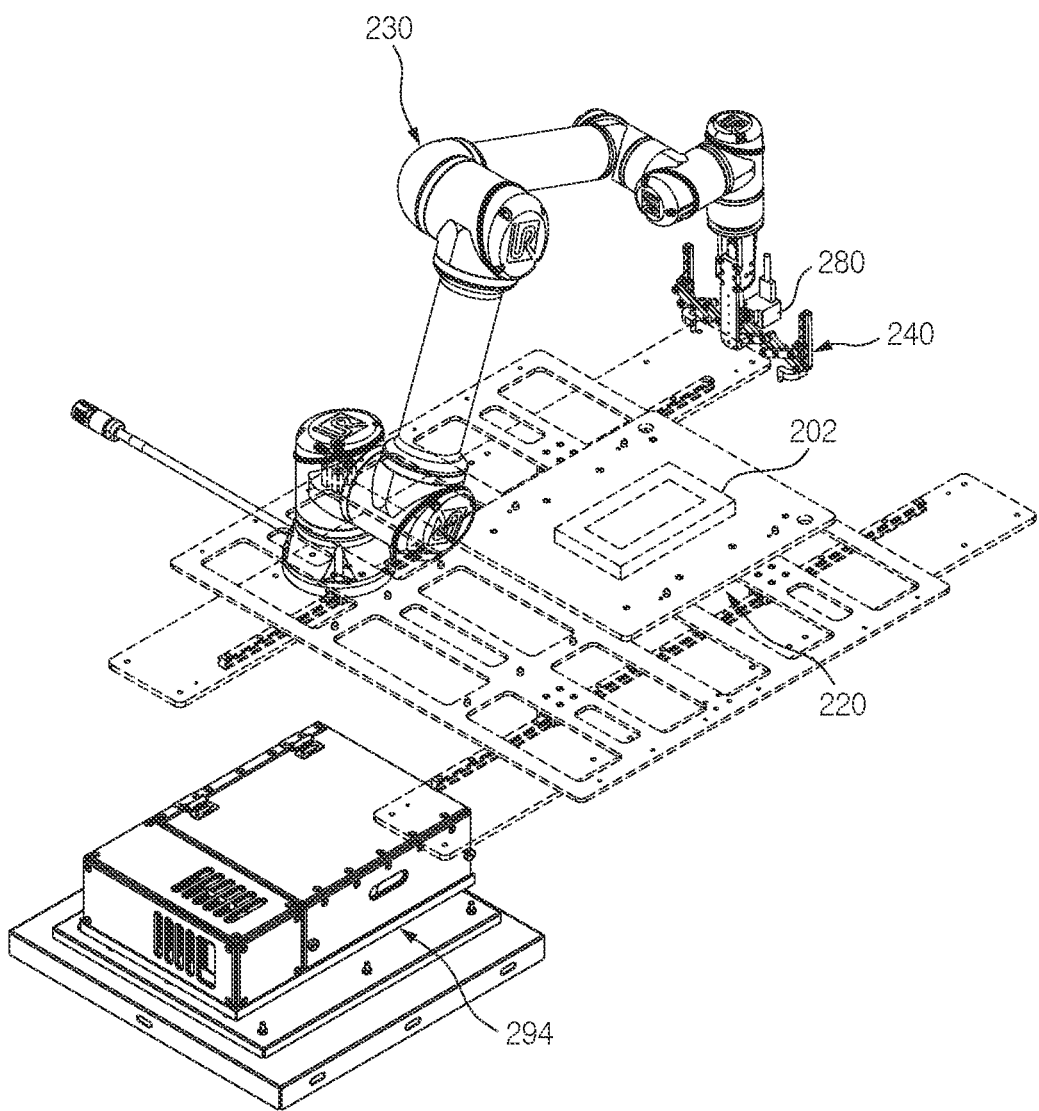
FIG. 5 is a view illustrating an articulated robot of the system for evaluating a built-in video recording device for a vehicle according to the embodiment of the present disclosure

For example, referring to FIG. 5, the mount 220 may be provided in the form of a quadrangular plate, and the vehicle display device 202 may be mounted on an upper surface of the mount 220.

The articulated robot 230 is configured to selectively move (e.g., rectilinearly move and rotate) the electrostatic touch unit 240 in the GUI test chamber 210.

The articulated robot 230 may have various structures capable of moving and rotating the electrostatic touch unit 240 in an upward/downward direction and a leftward/rightward direction in the GUI test chamber 210. The present disclosure is not restricted or limited by the structure of the articulated robot.

For example, referring to FIG. 5, a typical six-axis robot including six joint members may be used as the articulated robot 230.

According to another embodiment of the present disclosure, the articulated robot may include five or less joint members or include seven or more joint members.

Referring to FIGS. 6 to 11, the electrostatic touch unit 240 is connected to the articulated robot 230 so as to be movable by the articulated robot 230. The electrostatic touch unit 240 is configured to electrostatically touch the GUI screen 202*a*.

For example, the electrostatic touch unit 240 may be connected to an end of an articulated unit and selectively moved and rotated in the upward/downward direction and the leftward/rightward direction by the articulated unit.

The electrostatic touch unit 240 may have various structures capable of electrostatically touching the GUI screen 202*a*.

For example, the electrostatic touch unit 240 may include a first touch tip 250 configured to come into contact with the GUI screen 202*a*, a second touch tip 260 configured to come into contact with the GUI screen 202*a* while operating separately from the first touch tip 250, and a movement unit 270 configured to selectively move the first touch tip 250 and the second touch tip 260 in a direction in which the first touch tip 250 and the second touch tip 260 approach each other or in a direction in which the first touch tip 250 and the second touch tip 260 move away from each other.

The first touch tip 250 is configured to electrostatically touch the GUI screen 202a.

For example, the GUI screen 202a may be a touch screen provided on the vehicle display device 202. When the first touch tip 250 comes into contact with an icon, a menu screen, or the like displayed on the touch screen, a change in input signal (a change in capacitance) may occur due to the contact, and the vehicle display device 202 may perform the corresponding function based on the input signal.

The first touch tip 250 may be made of various materials with conductivity. The present disclosure is not restricted or limited by the material and structure of the first touch tip 250.

For example, the first touch tip 250 may be made of at least any one of silicone, urethane, rubber, and synthetic resin.

To impart conductivity to the first touch tip 250, carbon and metal powder may be mixed with a primary material (e.g., rubber) of the first touch tip 250 during a process of manufacturing the first touch tip 250. Alternatively, a conductive coating layer may be formed on an outer surface (or an inner surface) of the first touch tip 250 and then a conductive wire may be connected to the conductive coating layer.

The second touch tip 260 is configured to electrostatically touch the GUI screen 202a while operating separately from the first touch tip 250.

For example, the GUI screen 202a may be a touch screen provided on the vehicle display device 202. When the second touch tip 260 comes into contact with an icon, a menu screen, or the like displayed on the touch screen, a change in input signal (a change in capacitance) may occur due to the contact, and the vehicle display device 202 may perform the corresponding function based on the input signal.

The second touch tip 260 may be made of various materials with conductivity. The present disclosure is not restricted or limited by the material and structure of the second touch tip 260.

For example, the second touch tip 260 may be made of at least any one of silicone, urethane, rubber, and synthetic resin.

To impart conductivity to the second touch tip 260, carbon and metal powder may be mixed with a primary material (e.g., rubber) of the second touch tip 260 during a process of manufacturing the second touch tip 260. Alternatively, a conductive coating layer may be formed on an outer surface (or an inner surface) of the second touch tip 260 and then a conductive wire may be connected to the conductive coating layer.

The movement unit 270 is configured to selectively move the first touch tip 250 and the second touch tip 260 in the direction (e.g., the leftward/rightward direction based on FIG. 7) in which the first touch tip 250 and second touch tip 260 approach each other or move away from each other.

The movement unit 270 may have various structures capable of moving the first touch tip 250 and the second touch tip 260 in the direction in which the first touch tip 250 and second touch tip 260 approach each other or move away from each other. The present disclosure is not restricted or limited by the structure of the movement unit 270 and the method of operating the movement unit 270.

For example, the movement unit 270 may rectilinearly move the first touch tip 250 and the second touch tip 260 between a first position at which the first touch tip 250 and second touch tip 260 are adjacent to each other and a second position at which the first touch tip 250 and second touch tip 260 are spaced apart from each other.

According to another embodiment of the present disclosure, the movement unit may be configured to rotate the first touch tip and the second touch tip between the first position at which the first touch tip 250 and second touch tip 260 are adjacent to each other and the second position at which the first touch tip 250 and second touch tip 260 are spaced apart from each other.

According to the exemplary embodiment of the present disclosure, the movement unit 270 may include a base part 272, a driving source 274 disposed on the base part 272, a rectilinearly movable member 276 configured to be rectilinearly moved by the driving source 274, a first link part 278 connected to the first touch tip 250 and configured to rectilinearly move the first touch tip 250 relative to the second touch tip 260 by being selectively unfolded or folded corresponding to the rectilinear movement of the rectilinearly movable member 276, and a second link part 279 connected to the second touch tip 260 and configured to rectilinearly move the second touch tip 260 relative to the first touch tip 250 by being selectively unfolded or folded corresponding to the rectilinear movement of the rectilinearly movable member 276.

The base part 272 is connected to an end of the articulated robot 230. For example, a flange portion (not illustrated) having an extended cross-section may be provided at an end of the base part 272, and the flange portion may be fastened to the end of the articulated robot 230 by bolting.

The driving source 274 is disposed on the base part 272 and provides driving power for rectilinearly moving the rectilinearly movable member 276.

Various driving sources capable of providing driving power may be used as the driving source 274. The present disclosure is not restricted or limited by the type and structure of the driving source 274.

For example, a typical solenoid may be used as the driving source 274. According to another embodiment of the present disclosure, a hydraulic cylinder (or a pneumatic cylinder) or a motor may be used as the driving source.

The rectilinearly movable member 276 is connected to the driving source 274 so as to be selectively and rectilinearly moved by the driving power of the driving source 274.

For example, the rectilinearly movable member 276 may be provided in the form of a rod having a circular cross-section. Alternatively, the rectilinearly movable member may have a quadrangular cross-sectional shape or other cross-sectional shapes.

The first link part 278 may be unfolded or folded by operating in conjunction with the rectilinear movement of the rectilinearly movable member 276, thereby rectilinearly moving the first touch tip 250 in the direction in which the first touch tip 250 approaches or moves away from the second touch tip 260.

The first link part 278 may have various structures in accordance with required conditions and design specifications. The present disclosure is not restricted or limited by the structure of the first link part 278.

For example, the first link part 278 may include a first idle link member 278a rotatably connected to the base part 272, a first driving link member 278b rotatably coupled to the first idle link member 278a so as to intersect the first idle link member 278a and having one end rotatably connected to the rectilinearly movable member 276, and a first support link member 278c connected to any one of the first idle link member 278a and the first driving link member 278b and configured to support the first touch tip 250.

Hereinafter, an example will be described in which the first support link member 278c is connected to the first idle link member 278a. Alternatively, the first support link member may be connected to the first driving link member.

The first idle link member 278a and the first driving link member 278b may be connected to each other to define an approximately 'X' shape. When one end of the first driving link member 278b rectilinearly moves in conjunction with the rectilinear movement of the rectilinearly movable member 276, the first idle link member 278a and the first support link member 278c may rotate in conjunction with the rectilinear movement of the first driving link member 278b, thereby rectilinearly moving the first touch tip 250.

Figure 6:
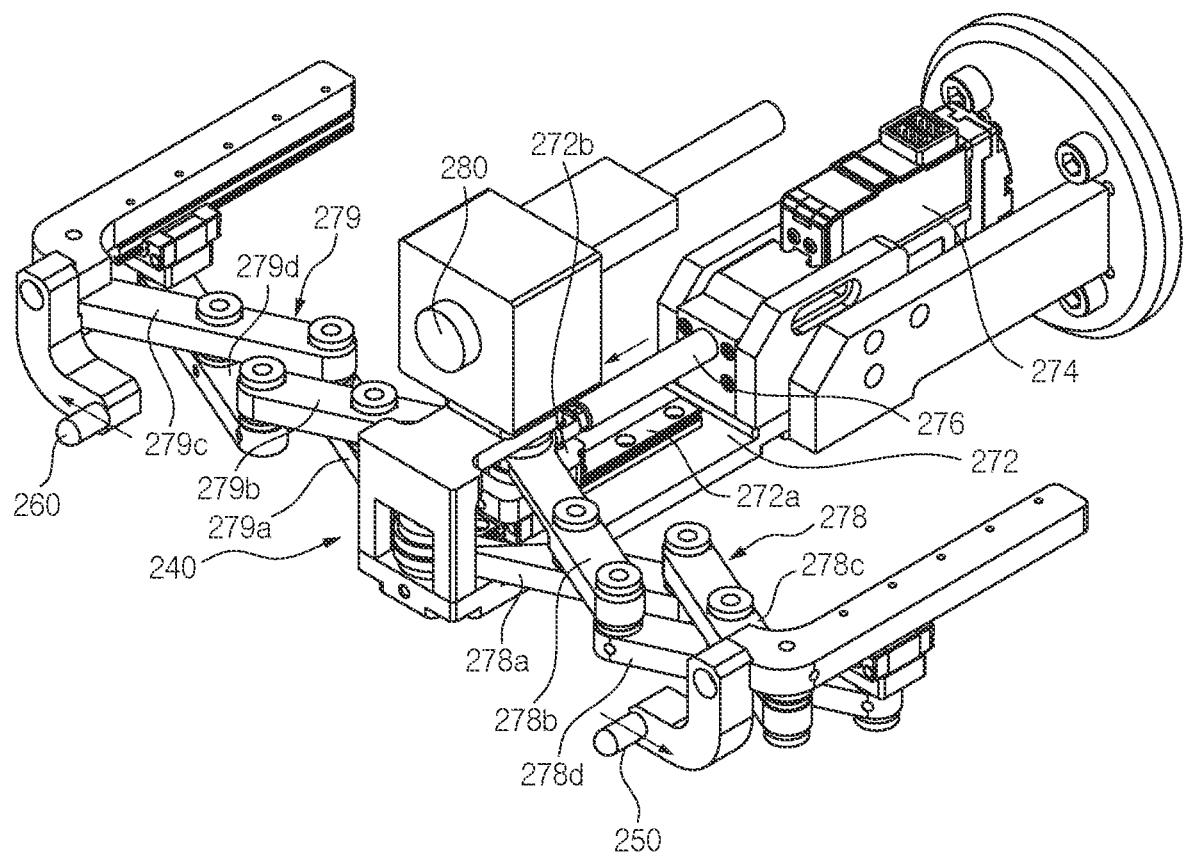
FIG. 6 is a view illustrating an electrostatic touch unit of the system for evaluating a built-in video recording device for a vehicle according to the embodiment of the present disclosure.
Figure 7:
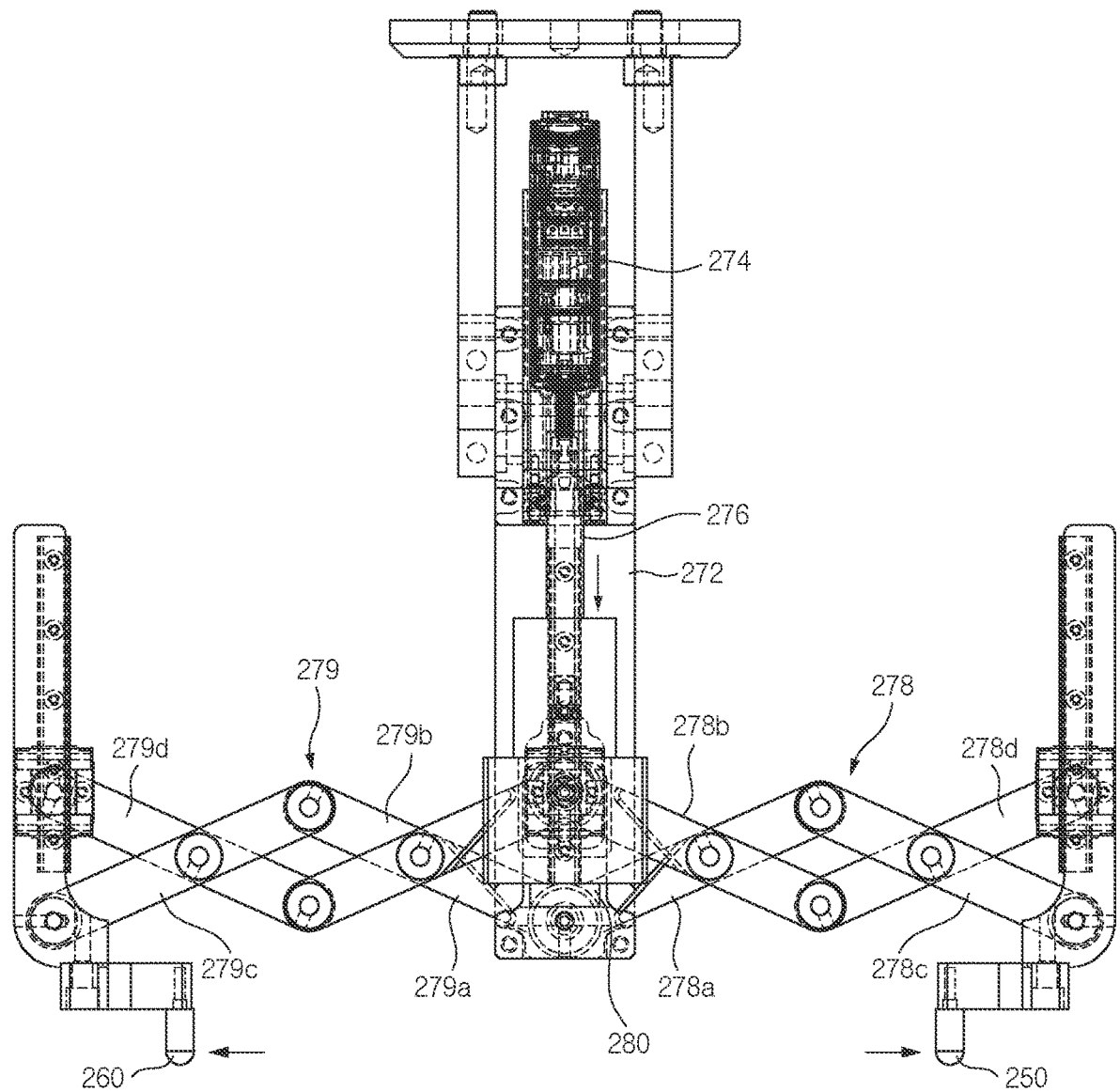
FIG. 7 is a view illustrating an electrostatic touch unit of the system for evaluating a built-in video recording device for a vehicle according to the embodiment of the present disclosure.

For example, referring to FIGS. 6 and 7, when the rectilinearly movable member 276 moves in a direction in which a drive part is extended to the outside (in a downward direction based on FIG. 7), the first driving link member 278b may move in a direction in which one end of the first driving link member 278b approaches one end of the first idle link member 278a (move in a direction in which the other end of the first driving link member approaches the other end of the first idle link member), and at the same time, the first support link member 278c is unfolded in a direction in which the first support link member 278c moves away from one end of the first driving link member 278b, such that the first touch tip 250 may move away from the second touch tip 260.

Figure 8:
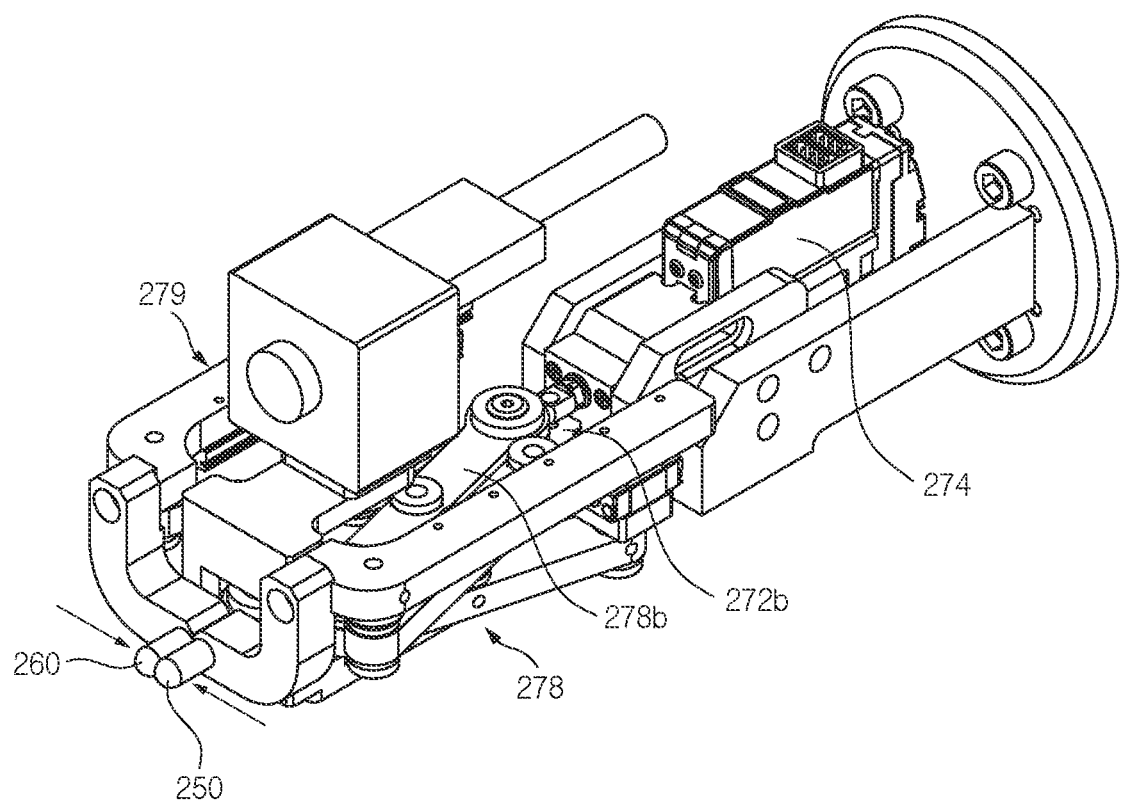
FIG. 8 is a view illustrating an electrostatic touch unit of the system for evaluating a built-in video recording device for a vehicle according to the embodiment of the present disclosure.
Figure 9:
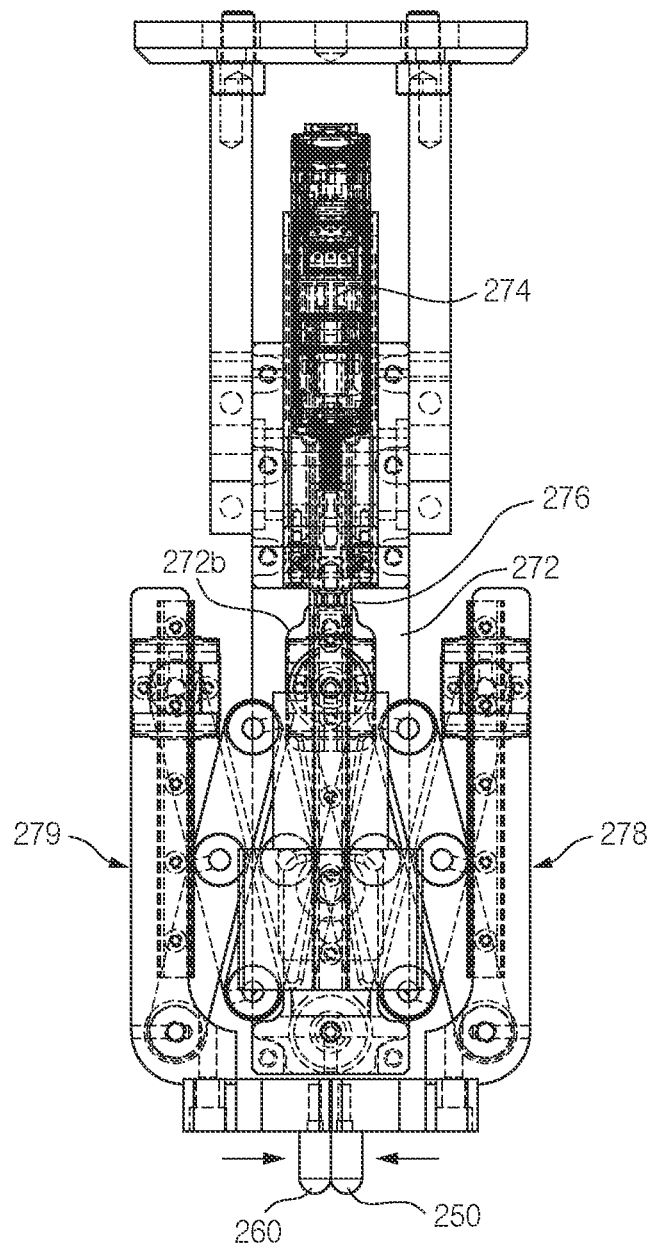
FIG. 9 is a view illustrating an electrostatic touch unit of the system for evaluating a built-in video recording device for a vehicle according to the embodiment of the present disclosure.
Figure 10:
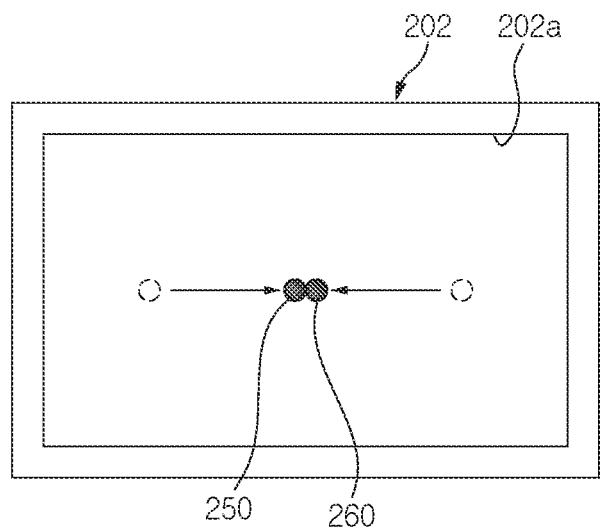
FIG. 10 is a view illustrating an operating state of first and second touch tips of the system for evaluating a built-in video recording device for a vehicle according to the embodiment of the present disclosure.
Figure 11:
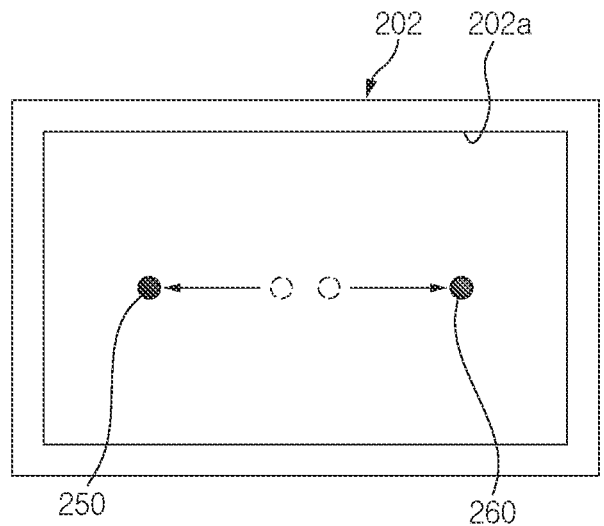
FIG. 11 is a view illustrating an operating state of first and second touch tips of the system for evaluating a built-in video recording device for a vehicle according to the embodiment of the present disclosure.
Figure 12:
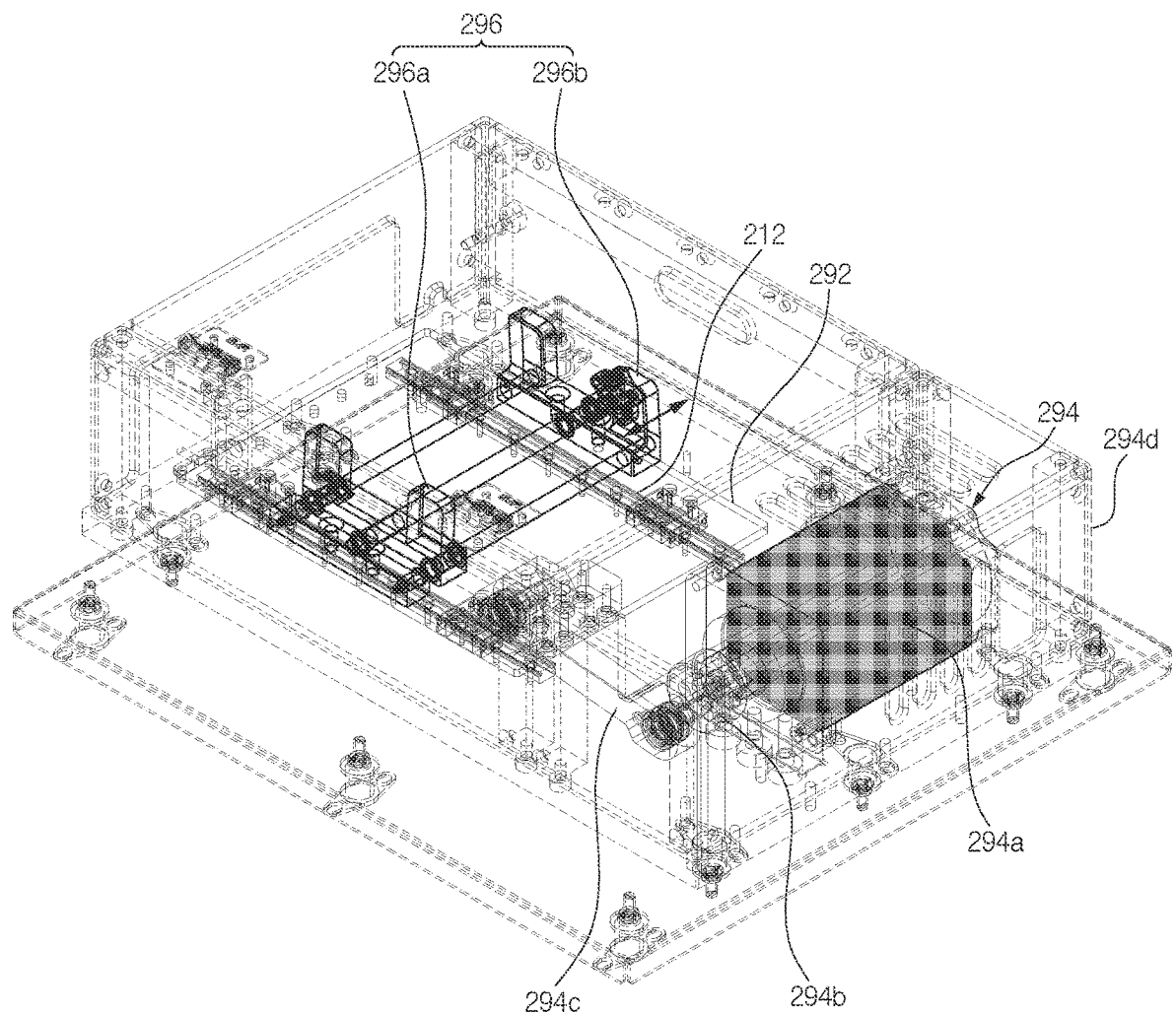
FIG. 12 is a view illustrating a vibrator of the system for evaluating a built-in video recording device for a vehicle according to the embodiment of the present disclosure.
Figure 13:
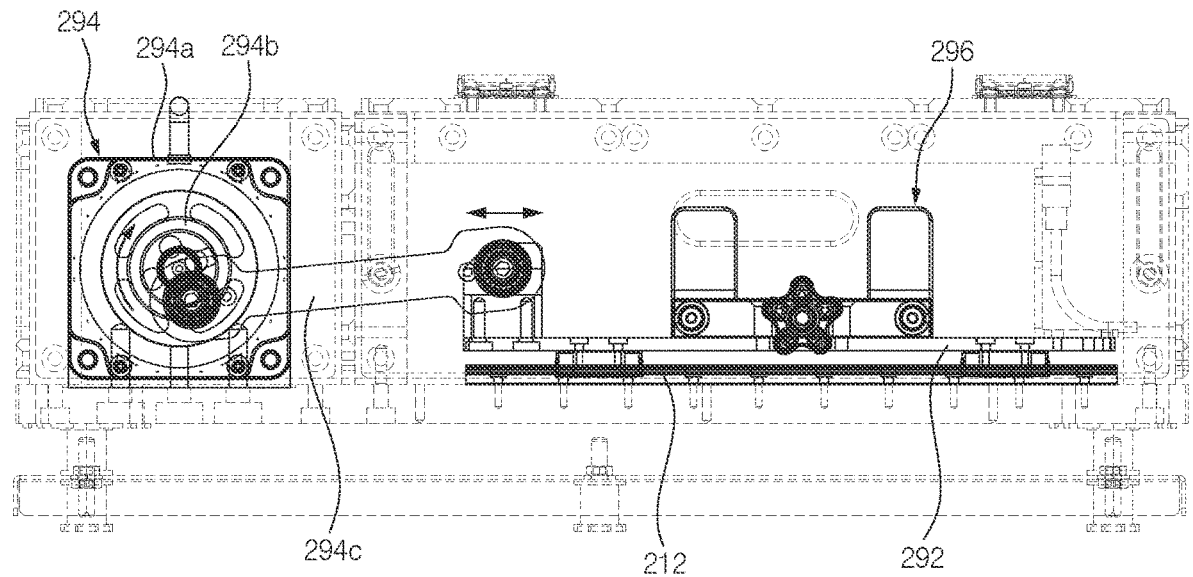
FIG. 13 is a view illustrating a vibrator of the system for evaluating a built-in video recording device for a vehicle according to the embodiment of the present disclosure.

On the contrary, referring to FIGS. 8 and 9, when the rectilinearly movable member 276 moves in a direction in which the drive part is accommodated (in an upward direction based on FIG. 9), the first driving link member 278b moves in a direction in which one end of the first driving link member 278b moves away from one end of the first idle link member 278a (moves in a direction in which the other end of the first driving link member moves away from the other end of the first idle link member), and at the same time, the first support link member 278c is folded in a direction in which the first support link member 278c approaches one end of the first driving link member 278b, such that the first touch tip 250 may approach the second touch tip 260.

In particular, the first link part 278 may include a first connection link member 278d having one end connected to the other of the first idle link member 278a and the first driving link member 278b, and the other end connected to the first support link member 278c. For example, one end of the first connection link member 278d may be connected to the first driving link member 278b, and the other end of the first connection link member 278d may be connected to the first support link member 278c.

Since the first driving link member 278b and the first support link member 278c are connected through the first connection link member 278d as described above, an unnecessary movement (swaying and vibration) of the first support link member 278c may be minimized. Therefore, it is possible to obtain an advantageous effect of improving movement stability and reliability of the first touch tip 250.

The second link part 279 is unfolded or folded by operating in conjunction with the rectilinear movement of the rectilinearly movable member 276, thereby rectilinearly moving the second touch tip 260 in the direction in which the second touch tip 260 approaches or moves away from the first touch tip 250.

The second link part 279 may have various structures in accordance with required conditions and design specifications. The present disclosure is not restricted or limited by the structure of the second link part 279.

For example, the second link part 279 may include a second idle link member 279a rotatably connected to the base part 272, a second driving link member 279b rotatably coupled to the second idle link member 279a so as to intersect the second idle link member 279a and having one end rotatably connected to the rectilinearly movable member 276, and a second support link member 279c connected to any one of the second idle link member 279a and the second driving link member 279b and configured to support the second touch tip 260.

Hereinafter, an example will be described in which the second support link member 279c is connected to the second idle link member 279a. Alternatively, the second support link member may be connected to the second driving link member.

The second idle link member 279a and the second driving link member 279b may be connected to each other to define an approximately 'X' shape. When one end of the second driving link member 279b rectilinearly moves in conjunction with the rectilinear movement of the rectilinearly movable member 276, the second idle link member 279a and the second support link member 279c may rotate in conjunction with the rectilinear movement of the second driving link member 279b, thereby rectilinearly moving the second touch tip 260.

For example, referring to FIGS. 6 and 7, when the rectilinearly movable member 276 moves in the direction in which the drive part is extended to the outside (in the downward direction based on FIG. 7), the second driving link member 279b may move in a direction in which one end of the second driving link member 279b approaches one end of the second idle link member 279a (move in a direction in which the other end of the second driving link member 279b approaches the other end of the second idle link member 279a), and at the same time, the second support link member 279c is unfolded in a direction in which the second support link member 279c moves away from one end of the second driving link member 279b, such that the second touch tip 260 may move away from the first touch tip 250.

On the contrary, referring to FIGS. 8 and 9, when the rectilinearly movable member 276 moves in the direction in which the drive part is accommodated (in the upward direction based on FIG. 9), the second driving link member 279b may move in a direction in which one end of the second driving link member 279b moves away from one end of the second idle link member 279a (move in a direction in which the other end of the second driving link member 279b moves away from the other end of the second idle link member 279a), and at the same time, the second support link member 279c is folded in a direction in which the second support link member 279c approaches one end of the second driving link member 279b, such that the second touch tip 260 may approach the first touch tip 250.

In particular, the second link part 279 may include a second connection link member 279d having one end connected to the other of the second idle link member 279a and the second driving link member 279b, and the other end connected to the second support link member 279c. For example, one end of the second connection link member 279d may be connected to the second driving link member 279b, and the other end of the second connection link member 279d may be connected to the second support link member 279c.

Since the second driving link member 279b and the second support link member 279c are connected through the second connection link member 279d as described above, an unnecessary movement (swaying and vibration) of the second support link member 279c may be minimized. Therefore, it is possible to obtain an advantageous effect of improving movement stability and reliability of the second touch tip 260.

According to the exemplary embodiment of the present disclosure, the system 10 for evaluating a built-in video recording device for a vehicle may include a sliding rail 272a provided on the base part 272 and disposed in the rectilinear movement direction of the rectilinearly movable member 276, and a sliding member 272b connected to the rectilinearly movable member 276 and configured to slide along the sliding rail 272a. One end of the first driving link member 278b may be rotatably connected to the sliding member 272b, and one end of the second driving link member 279b may be rotatably connected to the sliding member 272b.

Since one end of the first driving link member 278b and one end of the second driving link member 279b are connected to the sliding member 272b which is moved along the sliding rail 272a by the rectilinear movement of the rectilinearly movable member 276 as described above, the swaying of the rectilinearly movable member 276 (the swaying of the end of the rectilinearly movable member 276) may be minimized, and unnecessary movements of the first driving link member 278b and the second driving link member 279b connected to the rectilinearly movable member 276 may be inhibited. Therefore, it is possible to obtain an advantageous effect of more effectively inhibiting the swaying and vibration of the first touch tip 250 and second touch tip 260.

According to the exemplary embodiment of the present disclosure, the system 10 for evaluating a built-in video recording device for a vehicle may include a GUI test camera 280 connected to the articulated robot 230 and configured to capture an image of the GUI screen 202a.

For example, the GUI test camera 280 may be disposed at an uppermost end of the base part 272. According to another embodiment of the present disclosure, the GUI test camera may be disposed at a lower end of the base part or the GUI test camera may be connected directly to the articulated robot.

A typical camera capable of capturing an image of the GUI screen 202a may be used as the GUI test camera 280. The present disclosure is not restricted or limited by the type and structure of the GUI test camera 280.

The GUI test camera 280 may be used to specify a touch position on the GUI screen 202a. The automatic evaluating part 100 may use the GUI test camera 280 to simultaneously check an overall control state in the GUI test part 200.

In the embodiment of the present disclosure illustrated and described above, the example has been described in which the electrostatic touch unit 240 includes the two touch tips (the first touch tip 250 and the second touch tip 260). However, according to another embodiment of the present disclosure, only a single touch tip may constitute the electrostatic touch unit.

According to the exemplary embodiment of the present disclosure, the system 10 for evaluating a built-in video recording device for a vehicle may include a vibrator 294 configured to apply vibration to the built-in video recording device 203 for a vehicle depending on a command from the automatic evaluating part 100.

For example, the system 10 for evaluating a built-in video recording device for a vehicle may include a seating bed 292 disposed in the GUI test chamber 210 and configured to allow the vehicle display device 202 to be seated thereon, and the vibrator 294 disposed in the GUI test chamber 210 and configured to selectively apply vibration to the seating bed 292.

For reference, in the embodiment of the present disclosure, the configuration in which the vibration is applied to the seating bed 292 may include both a case in which the vibration is applied to the seating bed 292 in a horizontal direction (the leftward/rightward direction) and a case in which the vibration is applied to the seating bed 292 in a vertical direction (the upward/downward direction).

The seating bed 292 may have various structures on which the vehicle display device 202 may be seated. The present disclosure is not restricted or limited by the structure and shape of the seating bed 292.

For example, the seating bed 292 may be provided in the form of an approximately quadrangular plate, and the vehicle display device 202 may be seated on an upper surface of the seating bed 292.

The vibrator 294 may have various structures capable of selectively applying vibration (impact) to the seating bed 292. The present disclosure is not restricted or limited by the type and structure of the vibrator 294.

For example, the vibrator 294 may include a vibration motor 294a disposed in the GUI test chamber 210, a rotary member 294b configured to be rotated by the vibration motor 294a, and a conversion member 294c having one end rotatably connected to the rotary member 294b and spaced apart from a rotation center of the rotary member 294b and the other end rotatably connected to the seating bed 292, the conversion member 294c being configured to convert a rotation of the rotary member 294b into a reciprocating rectilinear movement of the seating bed 292.

Various motors capable of rotating the rotary member 294b may be used as the vibration motor 294a. The present disclosure is not restricted or limited by the type and structure of the vibration motor 294a.

The rotary member 294b is rotated by the vibration motor 294a. For example, the rotary member 294b may be provided in the form of a circular plate and coaxially fastened to a motor shaft of the vibration motor 294a.

The conversion member 294c is configured to convert the rotation of the rotary member 294b into the reciprocating rectilinear movement (e.g., the horizontal rectilinear movement) of the seating bed 292.

One end of the conversion member 294c is connected to the rotary member 294b, and the other end of the conversion member 294c is connected to the seating bed 292.

More specifically, one end of the conversion member 294c is rotatably connected to the rotary member 294b so as to be spaced apart (eccentric) from the rotation center of the rotary member 294b, and the other end of the conversion member 294c is rotatably connected to the seating bed 292.

With the configuration, when the rotary member 294b rotates, the seating bed 292 may reciprocatingly and rectilinearly move in the horizontal direction, thereby applying vibration to the vehicle display device 202 seated on the seating bed 292.

For reference, the intensity of vibration applied to the vehicle display device 202 may be controlled by adjusting a rotational speed of the rotary member 294b.

In the embodiment of the present disclosure illustrated and described above, the example has been described in which the rotation of the rotary member 294b is converted into the rectilinear movement of the seating bed 292 by the conversion member 294c. However, according to another embodiment of the present disclosure, a combination of gears (a rack gear and a pinion gear) or a link structure may be used to convert the rotation of the rotary member into the rectilinear movement of the seating bed.

According to the exemplary embodiment of the present disclosure, the system 10 for evaluating a built-in video recording device for a vehicle may include a guide rail 212 provided in the GUI test chamber 210 and disposed in the horizontal direction. The seating bed 292 may reciprocatingly and rectilinearly move along the guide rail 212.

Since the seating bed 292 reciprocatingly and rectilinearly moves along the guide rail 212 as described above, a smooth reciprocating rectilinear movement of the seating bed 292 may be ensured. It is possible to obtain an advantageous effect of more effectively applying vibration to the vehicle display device 202.

According to the exemplary embodiment of the present disclosure, the system 10 for evaluating a built-in video recording device for a vehicle may include a cover member 294d disposed in the GUI test chamber 210 and configured to cover the vibrator 294.

The cover member 294d may be variously changed in structure and shape in accordance with required conditions and design specifications. The present disclosure is not restricted or limited by the structure and shape of the cover member 294d.

For example, the cover member 294d may be provided in the form of a quadrangular box entirely surrounding the vibrator 294. A door (not illustrated) may be disposed on an upper surface of the cover member 294d and open or close an entrance or exit (not illustrated) through which the vehicle display device 202 enters or exits the cover member 294d. Further, the seating bed 292 may be accommodated in the cover member 294d.

In addition, according to the exemplary embodiment of the present disclosure, the system 10 for evaluating a built-in video recording device for a vehicle may include a clamp 296 disposed on the seating bed 292 and configured to selectively lock the vehicle display device 202 to the seating bed 292.

Since the clamp 296 configured to lock the vehicle display device 202 to the seating bed 292 is provided as described above, it is possible to obtain an advantageous effect of inhibiting the separation of the vehicle display device 202 from the seating bed 292 during the process of applying vibration to the vehicle display device 202.

The clamp 296 may have various structures capable of locking the vehicle display device 202. The present disclosure is not restricted or limited by the structure of the clamp 296.

For example, the clamp 296 may include a first clamping member 296a disposed on the seating bed 292, and a second clamping member 296b disposed on the seating bed 292 and configured to approach or move away from the first clamping member 296a. The vehicle display device 202 may be locked between the first clamping member 296a and the second clamping member 296b.

For example, a manual manipulation knob (not illustrated) may be connected to the second clamping member 296b. The second clamping member 296b may rectilinearly approach or move away from the first clamping member 296a by rotating the manual manipulation knob.

In addition, according to the exemplary embodiment of the present disclosure, the GUI test part 200 may include an ammeter 298 configured to transmit a current applied from the power supply part 180 to the built-in video recording device 203 for a vehicle depending on a command from the automatic evaluating part 100.

According to the exemplary embodiment of the present disclosure, the GUI test part 200 may include a vehicle device sample 201.

The vehicle device sample 201 may include the vehicle display device 202, the built-in video recording device 203 for a vehicle, an auxiliary battery 204, an amplifier 205, an Ethernet switch unit (ESU) or an ICU 206, and a parking control device 207. Because these components are identical to samples of actual devices mounted in the vehicle, a detailed functional description thereof will be omitted.

Meanwhile, the automatic evaluating part 100 may include devices actually mounted in the vehicle as samples and perform verification using the samples. In this cases, the samples may include the built-in video recording device 203 (e.g., the built-in camera) for a vehicle, the front camera FC, the rear camera RC (ADAS PRK commonly used), the auxiliary battery 204, the vehicle display device 202 (e.g., an audio-video navigation terminal (AVNT) panel), an AVNT keyboard, a center control panel (CCP), the amplifier (AMP) 205, a speaker, the parking control device 207 (e.g., an ADAS PRK controller), a communication gateway (router) controller, and the like.

The articulated robot 230 may be controlled manually as well as being automatically evaluated, and the GUI test camera 280 disposed at the upper end of the articulated robot 230 may be used to specify the touch position.

In the related art, a user directly inputs commands such as touch, zoom-in, and zoom-out on the GUI screen 202a. However, according to the embodiment of the present disclosure, the articulated robot 230 may be used to enlarge or reduce the screen by touching the GUI screen with the first touch tip 250 and the second touch tip 260.

The processor 140 spreads or narrows the first touch tip 250 and the second touch tip 260 to input commands such as zoom-in (enlargement) and zoom-out (reduction) in a state in which the first touch tip 250 and the second touch tip 260 of the articulated robot 230 are in contact with the GUI screen 202a.

Referring to FIGS. 1, and 14 to 16, according to the exemplary embodiment of the present disclosure, the system 10 for evaluating a built-in video recording device for a vehicle may include the camera test parts 300, 300' configured to evaluate the performance of the front camera FC of the vehicle or the performance of the rear camera RC of the vehicle. The automatic evaluating part 100 may automatically evaluate the performance of the built-in video recording device 203 for a vehicle in cooperation with the camera test parts 300, 300'.

For reference, the camera test parts 300, 300' are configured to respectively and individually evaluate the performance of the front camera FC of the vehicle and the performance of the rear camera RC of the vehicle.

That is, in the embodiment of the present disclosure, the camera test parts 300, 300' may include both a front camera test part (e.g., 300) configured to evaluate the performance of the front camera FC of the vehicle, and a rear camera test part (e.g., 300') configured to evaluate the performance of the rear camera RC of the vehicle.

Hereinafter, an example will be described in which the front camera test part (e.g., 300) and the rear camera test part (e.g., 300') have the same structure.

The camera test parts 300, 300' may have various structures capable of evaluating the performance of the front camera FC of the vehicle or the performance of the rear camera RC of the vehicle.

For example, the camera test parts 300, 300' may each include a camera test chamber 310 having an accommodation space therein, a camera mount 320 disposed in the camera test chamber 310 and configured to support the front camera FC or the rear camera RC, an inner display part 330 disposed inside the camera test chamber 310 and configured to output video data, and an outer display part 340 disposed outside the camera test chamber 310 and configured to output video data.

The camera test chamber 310 may have various structures having the accommodation space therein.

Figure 14:
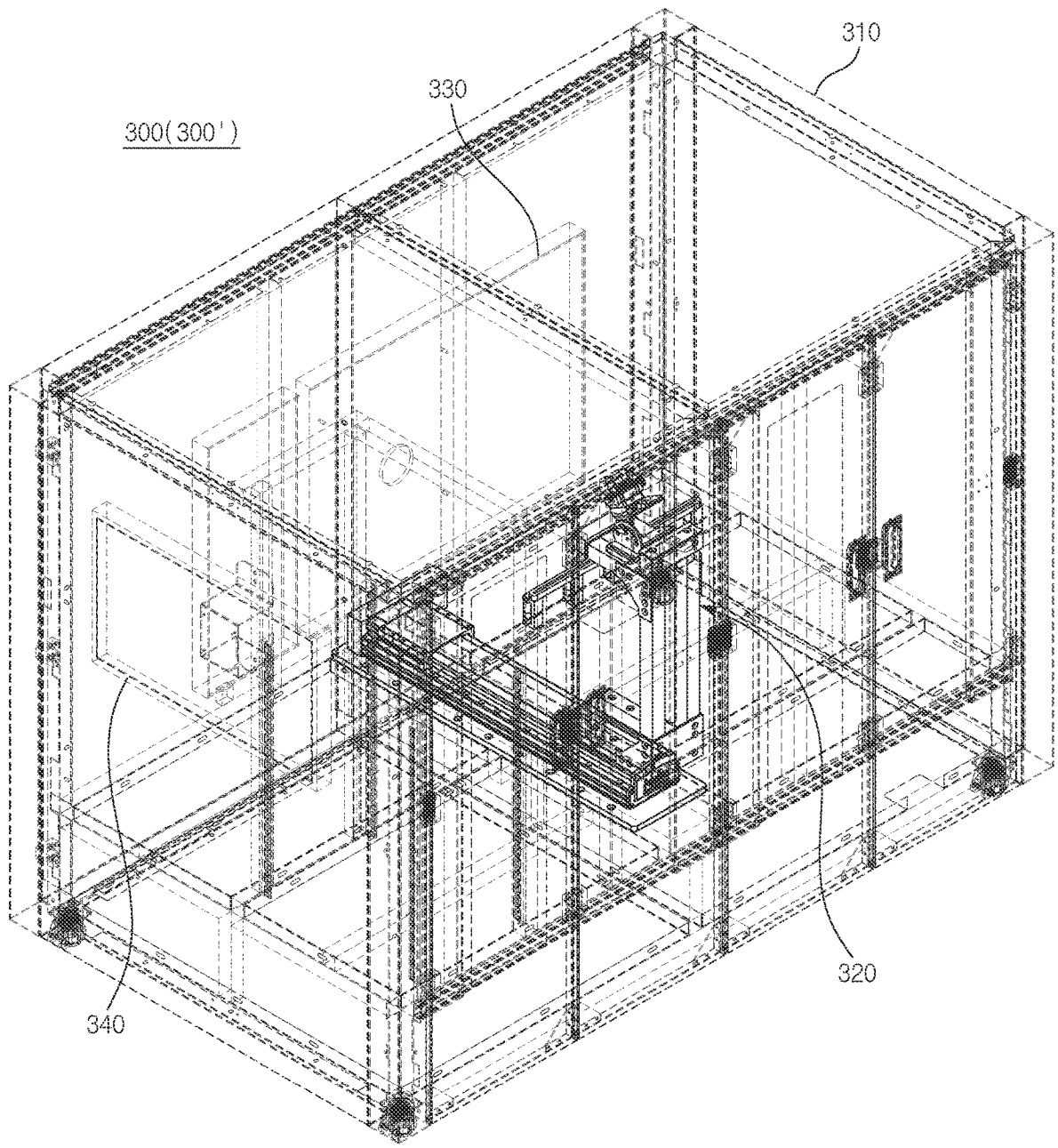
FIG. 14 is a view illustrating a camera test part of the system for evaluating a built-in video recording device for a vehicle according to the embodiment of the present disclosure.

For example, referring to FIG. 14, the camera test chamber 310 may be provided in the form of a quadrangular box having the accommodation space therein.

Further, a door (not illustrated) may be disposed at a lateral side of the camera test chamber 310 and open or close an entrance or exit (not illustrated) through which the front camera FC of the vehicle (or the rear camera of the vehicle) enters and exits the camera test chamber 310.

The camera mount 320 is disposed in the camera test chamber 310 and configured to support the front camera FC of the vehicle (or the rear camera of the vehicle).

The camera mount 320 may have various structures capable of supporting the front camera FC of the vehicle (or the rear camera of the vehicle). The present disclosure is not restricted or limited by the structure and shape of the camera mount 320.

Figure 15:
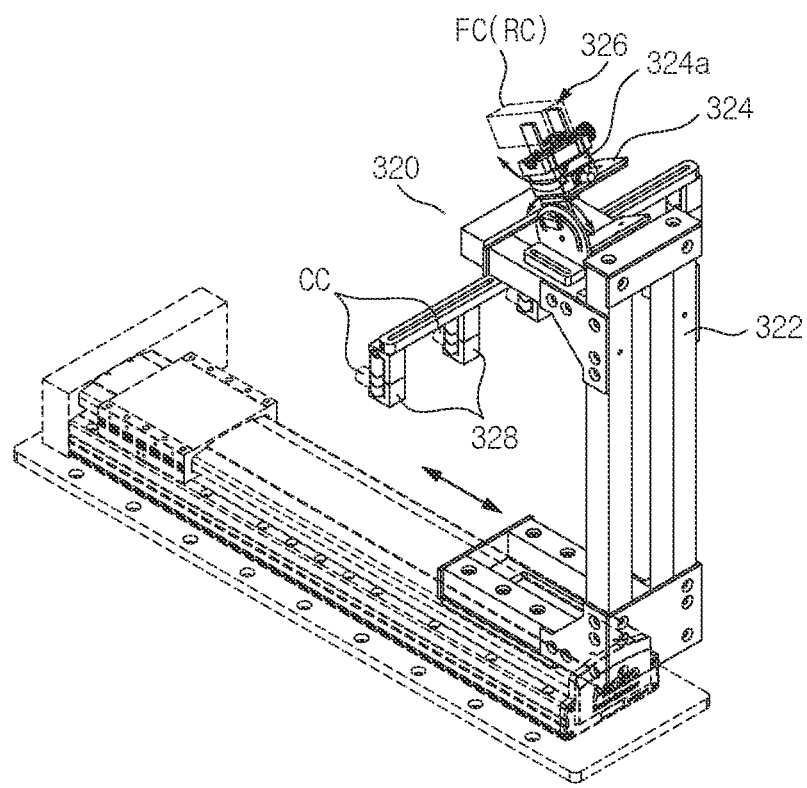
FIG. 15 is a view illustrating a camera test part of the system for evaluating a built-in video recording device for a vehicle according to the embodiment of the present disclosure.
Figure 16:
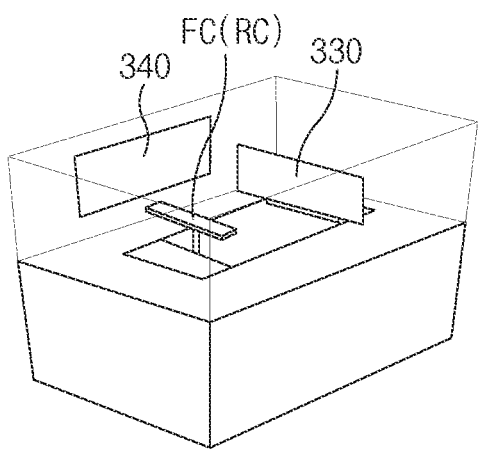
FIG. 16 is a view illustrating a camera test part of the system for evaluating a built-in video recording device for a vehicle according to the embodiment of the present disclosure.

For example, referring to FIG. 15, the camera mount 320 may include a mount main body 322, a tilting mount 324 configured to be tilted with respect to the mount main body 322, and a camera clamp 326 disposed on the tilting mount 324 and configured to selectively lock the front camera FC or the rear camera RC.

The mount main body 322 may have various structures capable of supporting the tilting mount 324. The present disclosure is not restricted or limited by the structure of the mount main body 322.

For example, the mount main body 322 may include a combination of a plurality of frame members (not illustrated) and a bracket member (not illustrated). Alternatively, the mount main body may be configured by a single frame member.

In particular, the mount main body 322 may be disposed in the camera test chamber 310 and rectilinearly move in a preset direction.

The tilting mount 324 may be tilted (rotated) by a predetermined angle with respect to the mount main body 322.

For example, the tilting mount 324 may be tilted by an angle of ±90° with respect to the mount main body 322.

The camera clamp 326 is disposed on the tilting mount 324 and locks the front camera FC (or the rear camera).

Since the camera clamp 326 is disposed on the tilting mount 324 as described above, an arrangement angle (an image capturing angle) of the front camera FC (or the rear camera) with respect to the inner display part 330 may be selectively adjusted.

The camera clamp 326 may have various structures capable of locking the vehicle display device 202. The present disclosure is not restricted or limited by the structure of the camera clamp 326.

For example, the camera clamp 326 may include a first camera clamp (not illustrated) disposed on the tilting mount 324, and a second camera clamp (not illustrated) disposed on the tilting mount 324 and configured to approach or move away from the first camera clamp. The front camera FC (or the rear camera) may be locked between the first camera clamp and the second camera clamp.

For example, a rotational manipulation knob (not illustrated) may be connected to the first camera clamp. The rotational manipulation knob may be manually operated to rectilinearly move the first camera clamp and the second camera clamp in the direction in which the first and second camera clamps approach or move away from each other.

In particular, the camera test parts 300, 300' may each include a tilting stage 324a configured to be tilted with respect to the tilting mount 324. The camera clamp 326 may be disposed on the tilting stage 324a.

The tilting stage 324a may be tilted (rotated) by a predetermined angle with respect to the tilting mount 324. The present disclosure is not restricted or limited by the tilting angle of the tilting stage 324a with respect to the tilting mount 324.

For example, the tilting stage 324a may be tilted by an angle of ±15° with respect to the tilting mount 324. The tilting angle of the tilting stage 324a with respect to the tilting mount 324 may be selectively changed by rotating a fine adjustment screw (not illustrated).

In particular, a curved seating surface (not illustrated) having a cross-section with an arc shape may be provided on an upper portion of the tilting mount 324, and a lower curved surface (not illustrated) having a cross-section with an arc shape corresponding to the curved seating surface may be provided on a lower portion of the tilting stage 324a. The lower curved surface may be in surface contact with the curved seating surface.

Since the tilting stage 324a is provided to be tilted with respect to the tilting mount 324 and the camera clamp 326 is disposed on the tilting stage 324a as described above, the arrangement angle (the image capturing angle) of the front camera FC (or the rear camera) with respect to the inner display part 330 may be more precisely and accurately adjusted.

According to the exemplary embodiment of the present disclosure, the camera test parts 300, 300' may each include a comparative camera clamp 328 connected to the mount main body 322 and configured to support a comparative camera CC.

The comparative camera clamp 328 may have various structures capable of supporting the comparative camera CC (e.g., an aftermarket camera product). The present disclosure is not restricted or limited by the structure of the comparative camera clamp 328 and the number of comparative camera clamps 328.

For example, a plurality of comparative camera clamps 328 may be disposed on a horizontal frame (not illustrated) connected to the mount main body 322 so as to be spaced apart from each other at predetermined intervals. The performance of the front camera FC (or the rear camera) and the performance of the plurality of comparative cameras CC may be simultaneously evaluated.

The inner display part 330 is disposed inside the camera test chamber 310 (e.g., on an inner wall surface) to display video data of the front camera FC received from the vehicle. The outer display part 340 is disposed outside the camera test chamber 310 (e.g., on an outer wall surface) to branch an output video of the inner display part 330 and allow the output video to be checked from the outside of the camera test chamber 310.

A typical monitor or other display panels may be used as the inner display part 330 and the outer display part 340. The present disclosure is not restricted or limited by the types and structures of the inner display part 330 and the outer display part 340.

The front camera FC (or the rear camera) mounted on the camera mount 320 may acquire a video outputted from the inner display part 330.

Figure 17:
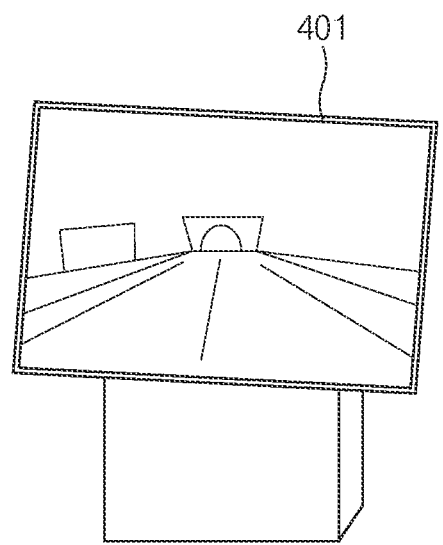
FIG. 17 is a view illustrating a control table of the system for evaluating a built-in video recording device for a vehicle according to the embodiment of the present disclosure.
Figure 18:
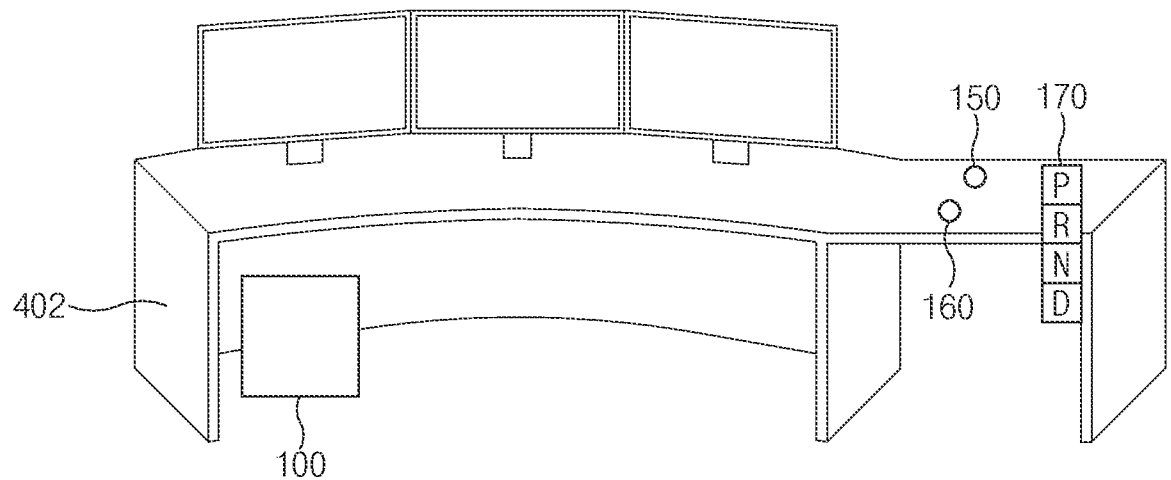
FIG. 18 is a view illustrating a control table of the system for evaluating a built-in video recording device for a vehicle according to the embodiment of the present disclosure.

Meanwhile, FIGS. 17 and 18 are views for explaining a configuration of a control table according to the embodiment of the present disclosure.

Referring to FIG. 17, an evaluation status board 401 displays an evaluation process and results.

Referring to FIG. 18, the automatic evaluating part 100 is implemented in the form of a personal computer (PC) in the control table 402, and a manual record button 150, a vibration application button 160, and a gear button 170 may be mounted on the table.

In addition, AVN/CCP samples for manual input may be mounted on the control table 402.

That is, a manual manipulation device may be manufactured as a separate product and mounted on the control table to enable manual manipulation of the built-in video recording device 203 for a vehicle and manipulation of an LED indicator.

As such, the present disclosure discloses an example of recording and verifying the video output from the display panel by each camera (the front camera FC and the rear camera RC). However, it is possible to verify video recording by inputting virtual video data (RGB) to a camera receiving end.

In addition, evaluation is possible even when there is no sample of the vehicle display device 202 (e.g., AVNT), but it can be implemented as a separate AVNT simulator so that a screen can be outputted when a display simulator, which may replace an AVNT product, is developed to be connected to a built-in camera. In this case, since the separate AVNT is portable, it can be used not only in the evaluation but also in the actual vehicle.

Figure 19:
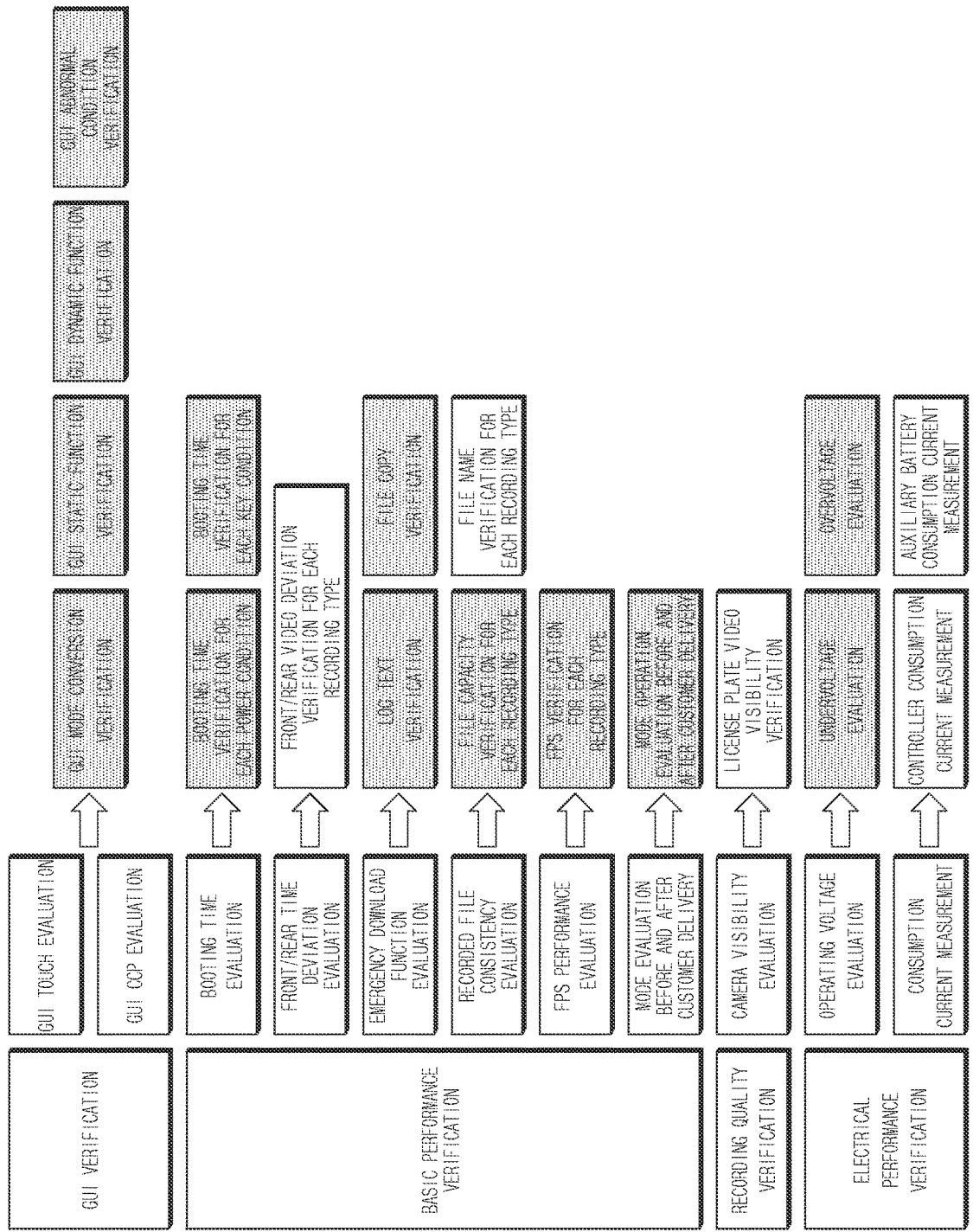
FIG. 19 is a view illustrating examples of automatic evaluation items for a built-in video recording device for a vehicle in the system for evaluating a built-in video recording device for a vehicle according to the embodiment of the present disclosure.
Figure 20:
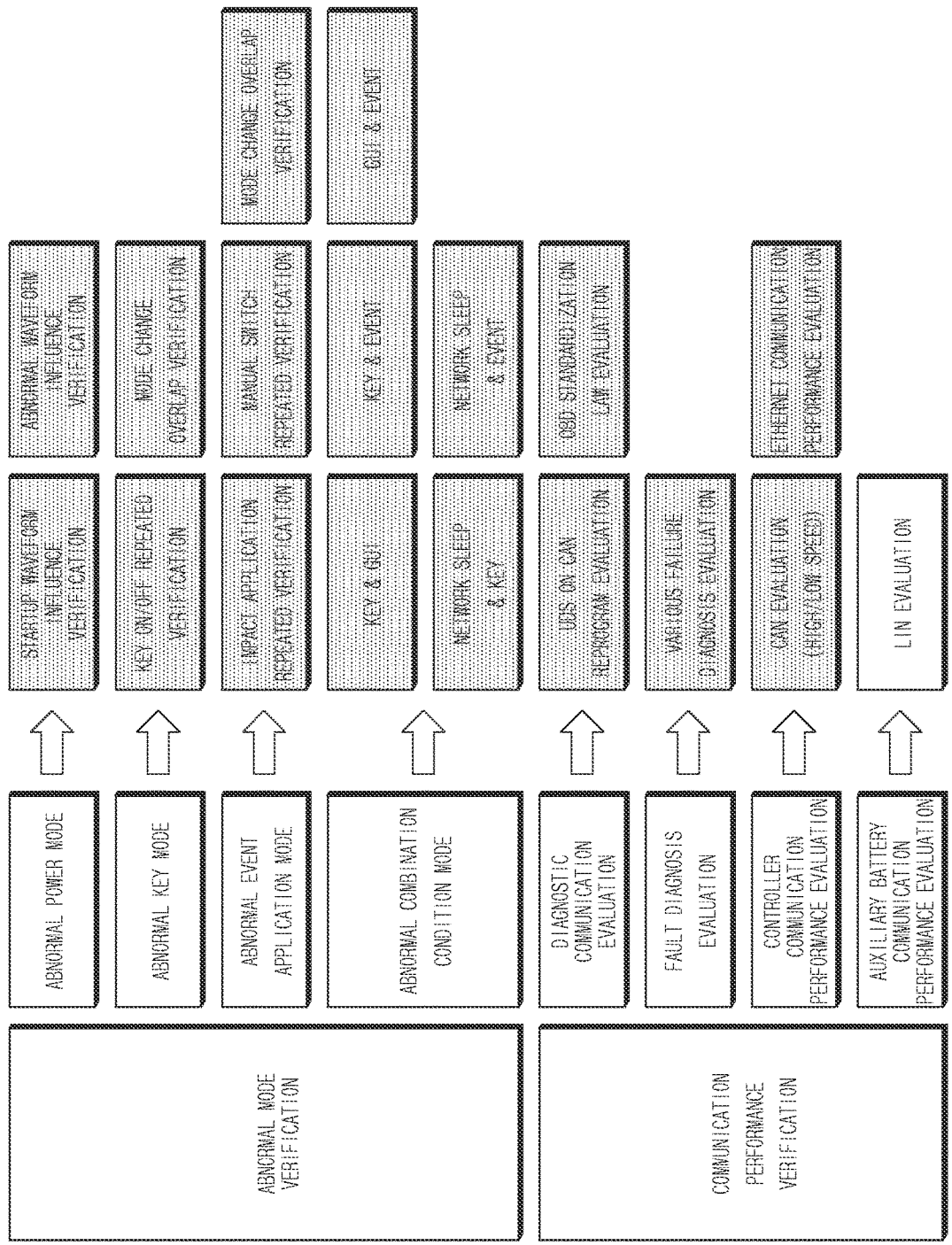
FIG. 20 is a view illustrating examples of automatic evaluation items for a built-in video recording device for a vehicle in the system for evaluating a built-in video recording device for a vehicle according to the embodiment of the present disclosure.

FIGS. 19 and 20 are views schematically illustrating examples of automatic evaluation items of the built-in video recording device 203 for a vehicle according to the embodiment of the present disclosure.

Referring to FIGS. 19 and 20, the automatic evaluating part 100 may perform GUI verification, basic performance verification, recording quality verification, electrical performance verification, abnormal mode verification, communication performance verification, and the like of the built-in video recording device 203 for a vehicle.

The automatic evaluating part 100 may perform evaluation items such as GUI touch evaluation and GUI center control panel (CCP) evaluation for GUI verification.

In addition, the GUI touch evaluation item may include detailed evaluation items such as GUI mode conversion verification, GUI static function verification, GUI dynamic function verification, GUI abnormal condition verification, and the like.

The static verification function is a test item that verifies the fixed video frame in the built-in camera GUI, and the dynamic verification item is a test item that determines whether to scroll a video list or play a video based on a vision technique.

The GUI mode conversion verification is a test item that checks an ability to switch panel control between the AVNT and the built-in camera. The GUI mode conversion verification is a test item to check whether control authority is normally transferred to the built-in camera through signal handshaking between the AVNT and the built-in camera through Ethernet or CAN communication when a built-in camera icon in an AVNT menu is touched.

The abnormal test condition is a test item that verifies whether a normal screen is outputted under various abnormal touch conditions by additionally setting control such as touch interval and simultaneous touch through touch coordinates or robot arm (the articulated robot 230) by a tester and implements software to automate the above four GUI verification methods.

The automatic evaluating part 100 performs evaluation items such as booting time evaluation, front/rear time deviation evaluation, emergency download function evaluation, recorded file consistency evaluation, FPS performance evaluation, and mode evaluation before and after customer delivery, for the basic performance evaluation.

The booting time evaluation item may include detailed evaluation items such as booting time verification for each power condition and booting time verification for each key condition.

A booting time indicates a time from a power-off state of the built-in camera to a point of time when a recording operation is possible when power is applied.

In this case, when recording is performed, an interior operation LED indicator of the front camera FC or the built-in camera lights up, and the automatic evaluating part 100 utilizes this point to monitor a power-off state of the built-in camera (IG OFF && Communication Sleep), and automatically measures a time until the LED indicator turns on after applying an ACC/IG power.

In addition, the automatic evaluating part 100 may measure and automatically record the time from a time of power application to a time of power application of the built-in camera LED indicator and evaluate this by measuring the time from the time when power is applied to the time when power is applied to the built-in camera LED indicator under various voltage conditions.

The front/rear time deviation evaluation items may include detailed evaluation items such as front/rear video deviation verification for each recording type.

To verify the front/rear time deviation, the automatic evaluating part 100 may output a timer that is synchronized to the inner display part 330 (e.g., the monitor) in the camera test chamber 310 and control the built-in camera to record it, and may automatically extract a recorded file and obtain the difference between timer time values displayed on the front/rear video after playback to obtain information related to a deviation of the front/rear recording time.

In addition, the automatic evaluating part 100 may measure the front/rear video deviation for each recording mode in order to verify a front/rear video recording deviation, and may automatically perform regular driving, driving impact, driving manual, regular parking, parking impact, and parking manual recording modes to measure the front/rear video deviation for each mode.

Particularly, the automatic evaluating part 100 may apply an impact to a G-sensor in the built-in camera using a vibration motor 294a for impact recording and perform the impact recording by applying vibrations when an impact condition is required during automatic evaluation.

The emergency download function evaluation item may include detailed evaluation items such as log text verification and file copy verification.

Emergency download, which is a function that extracts all videos stored by the built-in camera alone at a service center when the AVNT is damaged after a vehicle accident, is a function that automatically downloads all videos to an USB connected to the built-in camera when a specific power (e.g., B+/IGN/GND, etc.) is applied. Since the automatic evaluating part 100 can control all PINs of the built-in camera, it may automatically determine whether all recorded files have been copied normally by applying power that satisfies a condition to the built-in camera and monitoring whether files are automatically copied to the USB. In this case, a recorded file of a built-in camera dedicated USB can be automatically copied to the automatic evaluating part 100.

As such, the automatic evaluating part 100 may determine whether all recorded files are normally copied, may verify text suitability of a log text file automatically generated during emergency download, and may determine whether emergency download is normally performed.

The recording file consistency evaluation item may include detailed evaluation items such as file capacity verification for each recording type and file name verification for each recording type. In the case of file capacity suitability, it is an item that automatically determines whether the specification for the maximum capacity defined for each recording mode (regular driving/driving impact/driving manual/regular parking/parking impact/parking manual/time-lapse) is satisfied. The automatic evaluating part 100 may automatically extract only capacity information of a recorded video by automatically copying the file after performing recording with a maximum capacity for each recording mode, may filter the maximum capacity among them, and automatically compare and verify that this maximum capacity meets a specification. In addition, the automatic evaluating part 100 may automatically verify whether the recorded file satisfies a prescribed file name.

The frame per second (FPS) performance evaluation may include detailed evaluation items such as FPS verification for each recording type.

An FPS verification technique for each recording type is a new verification item that was not performed during actual vehicle verification. The automatic evaluating part 100 may record all videos for each recording mode in a full memory, and then may play each recorded file and extract the number of frames per second in real time, and may finally record Max FPS, Min FPS and Avg FPS values automatically.

The automatic evaluating part 100 may automatically calculate how much the Max FPS, Min FPS, and Avg FPS values exceed or dissatisfy an FPS criterion for each recording mode defined in the specification and automatically determine that it is a failure when it is less than the set criterion (tolerance).

The mode evaluation item before and after customer delivery may include detailed evaluation items such as operation evaluation before and after customer delivery.

The automatic evaluating part 100 may perform a camera visibility evaluation item to verify recording quality. The camera visibility evaluation item may include detailed evaluation items such as license plate video visibility verification.

For license plate visibility verification, the automatic evaluating part 100 may output the license plate to the front/rear camera test parts 300, 300' on the display panel, may gradually reduce a size from an actual size of the license plate, and may evaluate it by estimating a distance to the actual vehicle. The automatic evaluating part 100 may be provided with an illuminance control function on the display panel (monitor) itself of the front/rear camera test parts 300, 300' and automatically adjust brightness and may automatically verify license plate visibility by various an illuminance condition and estimated distance from the actual vehicle.

The automatic evaluating part 100 may perform evaluation items such as operating voltage evaluation and consumption current measurement to verify electrical performance.

The operating voltage evaluation item may include detailed evaluation items such as undervoltage evaluation and overvoltage evaluation. In this case, the consumption current measurement item may include detailed evaluation items such as controller consumption current measurement and auxiliary battery consumption current measurement.

The automatic evaluating part 100 may perform evaluation items such as an abnormal power mode, an abnormal key mode, an abnormal event application mode, and an abnormal combination condition mode for abnormal mode verification.

The abnormal power mode may include detailed evaluation items such as verification of a startup waveform influence and an abnormal waveform influence.

When verifying the abnormal power mode, the automatic evaluating part 100 may perform evaluation after presetting various abnormal power conditions in a graph form using the power supply part 180.

The automatic evaluating part 100 may apply a waveform such as a vehicle startup waveform or instantaneous power drop to the built-in camera during an operation of the built-in camera to determine whether recording is normally performed and whether there is a malfunction. In this case, the automatic evaluating part 100 may automatically determine whether recording is normally performed using whether an LED indicator is lit during recording and whether a built-in camera GUI menu is normally outputted. In addition, the automatic evaluating part 100 may periodically transmit a fault diagnosis request (Tx) message to the built-in camera through a communication line of the built-in camera, and when a fault code response occurs, may record it and automatically determine whether there is a fault.

The abnormal key mode may include detailed evaluation items such as key on/off repeated verification and mode change overlap verification.

The abnormal event application mode may include detailed evaluation items such as impact application repeated verification, manual switch repeated verification, and mode change overlap verification.

The abnormal combination condition mode may include detailed evaluation items such as key and GUI, key and event, GUI and event, network sleep and key, and network sleep and event.

For the abnormal combination condition mode verification, the automatic evaluating part 100 may automatically verify whether the built-in camera malfunctions under various abnormal conditions by combining a built-in camera power condition (B+/ACC/IG1), a GUI touch condition, and an impact application condition.

The automatic evaluating part 100 may determine whether it is normal by automatically measuring an LED indicator, a GUI menu normal output, a fault code occurrence, etc. after each of the abnormal conditions is applied, similarly to the power malicious mode verification.

The automatic evaluating part 100 may perform evaluation items such as diagnostic communication evaluation, fault diagnosis evaluation, controller communication performance evaluation, and auxiliary battery communication performance evaluation for communication performance verification.

The diagnostic communication evaluation may include detailed evaluation items such as UDS on CAN reprogram evaluation and OBD standardization law evaluation.

The failure diagnosis evaluation may include detailed evaluation items such as various failure diagnosis evaluations. The controller communication performance evaluation may include detailed evaluation items such as CAN evaluation (high/low speed) and Ethernet communication performance evaluation. The auxiliary battery communication performance evaluation may include detailed evaluation items such as LIN evaluation.

Meanwhile, a GUI touch automatic evaluation technique may be classified into two main methods. A first one thereof is a technique to virtually transmit touch coordinate information to the built-in camera controller to determine the transmitted GUI video when there is no AVNT sample. A second one thereof is a technique to determine a video by directly touching a AVNT panel with a robot arm (the articulated robot 230) by mounting an AVNT sample.

First, when there is no AVNT sample, a method of performing automatic simulation evaluation by inputting virtual touch coordinates instead of control of the robot arm (the articulated robot 230) is disclosed.

The automatic evaluating part 100 may learn GUI coordinates and videos that are determination criteria by virtually inputting touch coordinates. That is, the automatic evaluating part 100 does not have an AVNT sample and the robot arm (the articulated robot 230), but learns and stores coordinate information and a video executed by the touch in advance when the robot arm (the articulated robot 230) actually touches the AVNT.

Since the GUI specification transmitted by the built-in camera, which is the built-in video recording device, differ for each AVNT specification, it implements a function of acquiring and learning a video that is a determination criterion based on a AVNT platform.

That is, the automatic evaluating part 100 may learn in advance GUI coordinates and videos, which are determination criteria for automatic evaluation of the built-in video recording device 203 for a vehicle.

The automatic evaluating part 100 outputs a GUI branch screen of the built-in video recording device 203 (e.g., the built-in camera) for a vehicle, and outputs a topmost screen among the built-in camera menus. Next, it sets a function by touching each function tab in the topmost screen, learns and stores coordinate information related to the function. Specifically, when a user clicks a menu tab and a recording list tab on the AVN screen, coordinate information and a video to be executed may be learned and stored as a determination reference video.

In addition, the automatic evaluating part 100 may output a detailed screen when a menu tab or a recording list tab is clicked, may learn and save coordinate information by clicking a detailed menu tab (e.g., a copy tab, a delete tab, or a setting tab) on a detailed screen, and may output a more detailed menu when each detailed menu tab is clicked. It is possible to enter the GUI such as $1^{st}$ Depth, $2^{nd}$ Depth, $3^{rd}$ Depth from a GUI main menu through touch automation for each test item, and it makes it possible to return to Default Depth (main menu) when an independent test is performed.

As described above, the automatic evaluating part 100 may learn and store in advance coordinate information and a determination reference video when the menu tab is touched by a user.

The automatic evaluating part 100 selects an evaluation item of the built-in video recording device 203 for a vehicle as illustrated in FIGS. 19 and 20 for evaluation and starts the evaluation.

Then, the automatic evaluating part 100 may determine the evaluation in real time.

In this case, the automatic evaluating part 100 may compare a video transmitted from the built-in video recording device 203 (e.g., the built-in camera) for a vehicle to the vehicle display device 202 (e.g., AVNT) with the determination criterion video data to automatically determine whether the corresponding video data is normal. In this case, the automatic evaluating part 100 may branch-acquire low voltage differential signaling (LVDS) communication or Ethernet communication data and compare it with determination reference video data to perform automatic determination.

In addition, the automatic evaluating part 100 may output the branch-acquired LVDS (low voltage differential signaling) communication or Ethernet communication data to a situation monitor so that a user can visually determine whether it is normal.

The automatic evaluating part 100 ends the evaluation after automatic determination, automatically outputs a report on the evaluation, and performs log recording.

Meanwhile, when there is the AVNT sample, the evaluation may be performed by touching the AVNT screen by controlling the robot arm (the articulated robot 230).

The automatic evaluating part 100 may learn coordinates of a position touched by the robot arm and the video used as the determination criterion. That is, the automatic evaluating part 100 may control the robot arm (the articulated robot 230) to touch the AVNT sample. When the robot arm (the articulated robot 230) touches the AVNT sample, the automatic evaluating part 100 may learn and store coordinate information and videos executed by touch in advance.

As described above, the automatic evaluating part 100 may learn and store in advance coordinate information and a determination reference video when the menu tab is touched by the user.

The automatic evaluating part 100 selects an evaluation item of the built-in video recording device 203 for a vehicle as illustrated in FIGS. 19 and 20 for evaluation and starts the evaluation.

Then, the automatic evaluating part 100 may determine the evaluation in real time.

In this case, the automatic evaluating part 100 may compare a video transmitted from the built-in video recording device 203 (e.g., the built-in camera) for a vehicle to the vehicle display device 202 (e.g., AVNT) with the determination criterion video data to automatically determine whether the corresponding video data is normal. In this case, the automatic evaluating part 100 may branch-acquire low voltage differential signaling (LVDS) communication or Ethernet communication data and compare it with determination reference video data to perform automatic determination.

In addition, the automatic evaluating part 100 may output the branch-acquired LVDS (low voltage differential signaling) communication or Ethernet communication data to a situation monitor so that a user can visually determine whether it is normal.

The automatic evaluating part 100 ends the evaluation after automatic determination, automatically outputs a report on the evaluation, and performs log recording.

The built-in camera transmits a setting GUI and playback GUI to the AVNT panel using LVDS communication or Ethernet communication. Accordingly, the automatic evaluating part 100 may branch a video communication line between the AVNT and the built-in camera to branch and output the video transmitted from the built-in camera to the AVNT to the display part 130 of the automatic evaluating part 100.

Therefore, when performing initial test scenario and a determination screen learning process through a screen of the branched video, a user may learn a test sequence such that the test proceeds in an order in which the displayed GUI touch is touched with a mouse, and may store screen information that is outputted every time it is touched to implement it to be used as a comparison determination screen during actual automatic evaluation.

First, for each GUI platform specification, a tester captures and learns the test scenario and a determination criterion screen once, and then automatic evaluation is possible between the AVNT and the built-in camera of a same platform.

After scenario learning, it is possible to perform evaluation by separating a case that the aforementioned AVNT sample exists and a case that no AVNT sample exists. Accordingly, when the AVNT sample and the robot arm exist, the automatic evaluating part 100 may automatically determine whether or not it is a valid GUI output or not through GUI data that the robot arm (the articulated robot 230) directly touches the AVNT screen according to the scenario and branches at the same time.

As illustrated in FIGS. 6 to 11, the electrostatic touch unit 240 may include first touch tip 250 and second touch tip 260, and it is possible to evaluate an enlargement/reduction function of a playback screen in the same way as control through human fingers by adding enlarging/reducing control function to the first touch tip 250 and second touch tip 260. In addition, since the robot arm (the articulated robot 230) is equipped with a high-performance camera (the GUI test camera 280), the video outputted from the AVNT panel can be compared with the GUI transmitted from the built-in camera, and thus the built-in camera and the AVNT output GUI may be compared and determined.

When there is no AVNT sample, the automatic evaluating part 100 may automatically input virtual touch coordinate information to the built-in camera through LVDS or Ethernet communication to determine a screen based on GUI information outputted from the built-in camera.

As such, when there is no AVNT sample, built-in camera GUI software is independently verified, and when there is an AVNT sample, the built-in camera GUI software and the AVNT software can be compared and verified at the same time.

As such, according to the present disclosure, through development of a built-in camera system level automating evaluation device, GUI touch test may be quantified using robot arm control or automatic touch coordinate input software, and recording file full loading evaluation may be performed automatically. In addition, according to the present disclosure, various evaluations may be performed without time and space constraints by implementing quantitative test control for illuminance and license plate distance control, which was previously difficult to check under actual vehicle environmental conditions. In addition, the present disclosure can also be used for single item verification by partners who will develop our built-in camera system in the future and also be usefully used for local development in overseas technical research institutes.

Figure 21:
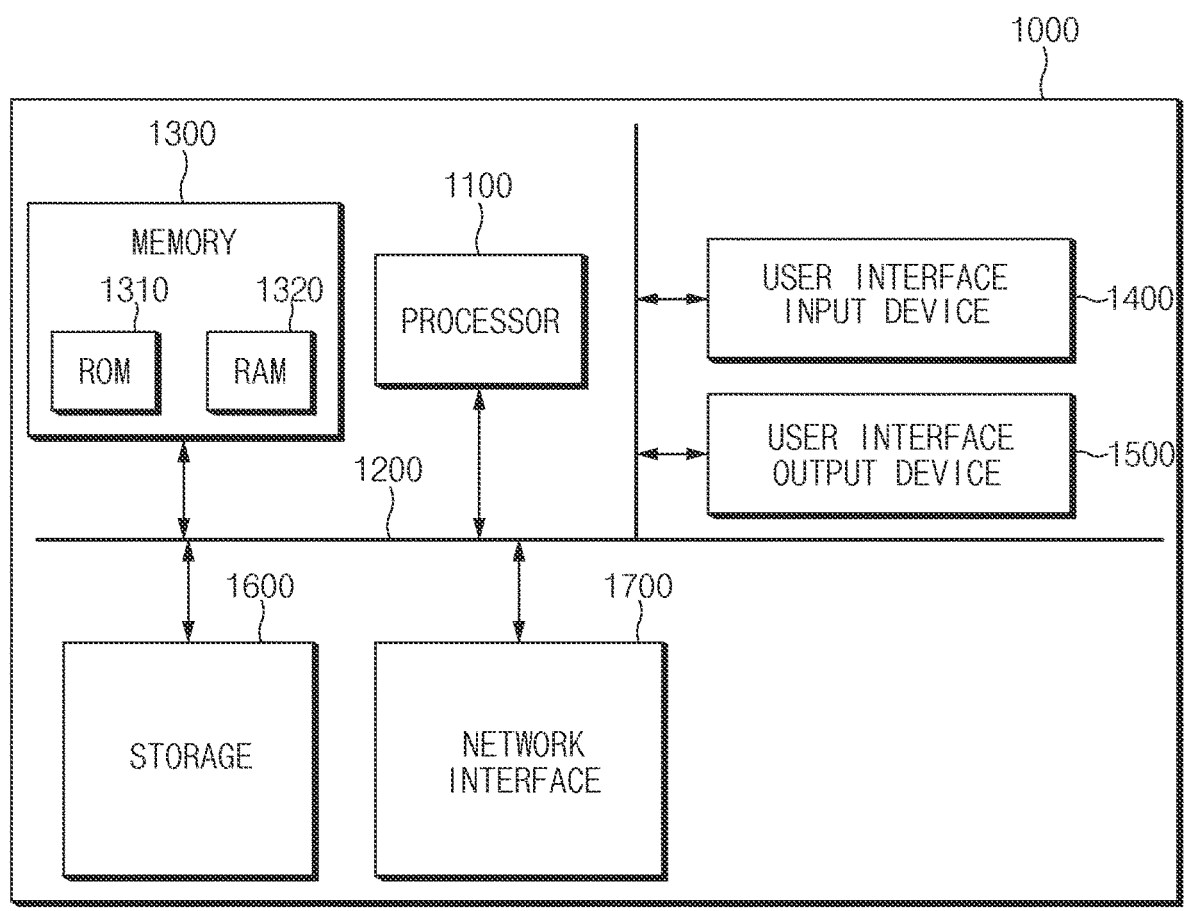
FIG. 21 is a view illustrating a computing system according to the embodiment of the present disclosure.

Meanwhile, FIG. 21 illustrates a computing system according to the embodiment of the present disclosure.

Referring to FIG. 21, a computing system 1000 includes at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read-only memory (ROM) 1310 and a random-access memory (RAM) 1320.

Accordingly, steps of a method or algorithm described in connection with the embodiments disclosed herein may be directly implemented by a hardware module, a software module, or a combination thereof, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application-specific integrated circuit (ASIC). The ASIC may reside within a user terminal. Alternatively, the processor and the storage medium may reside as separate components within the user terminal.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A system for evaluating a built-in video recording device for a vehicle, the system comprising:
a graphical user interface (GUI) test part configured to automatically perform evaluation of a GUI screen of a vehicle display device that operates in conjunction with the built-in video recording device for a vehicle; and
an automatic evaluating part configured to automatically evaluate performance of the built-in video recording device for a vehicle based on a result evaluated by the GUI test part,
wherein the GUI test part comprises:
a GUI test chamber having an accommodation space therein;
a mount disposed in the GUI test chamber and configured to support the vehicle display device;
an articulated robot disposed in the GUI test chamber; and
an electrostatic touch unit connected to the articulated robot so as to be movable by the articulated robot and configured to electrostatically touch the GUI screen,
wherein the electrostatic touch unit comprises:
a first touch tip configured to come into contact with the GUI screen;
a second touch tip configured to come into contact with the GUI screen separately from the first touch tip; and
a movement unit configured to selectively move the first touch tip and the second touch tip in a direction in which the first and second touch tips approach or move away from each other, and
wherein the movement unit comprises:
a base part;
a driving source disposed on the base part;
a rectilinearly movable member configured to be rectilinearly moved by the driving source;
a first link part connected to the first touch tip and configured to be selectively unfolded and folded in conjunction with a rectilinear movement of the rectilinearly movable member to rectilinearly move the first touch tip relative to the second touch tip; and
a second link part connected to the second touch tip and configured to be selectively unfolded and folded in conjunction with the rectilinear movement of the rectilinearly movable member to rectilinearly move the second touch tip relative to the first touch tip.

2. The system of claim 1, wherein the first link part comprises:
a first idle link member rotatably connected to the base part;
a first driving link member rotatably coupled to the first idle link member so as to intersect the first idle link member and having one end rotatably connected to the rectilinearly movable member; and
a first support link member connected to any one of the first idle link member and the first driving link member and configured to support the first touch tip, and
wherein the second link part comprises:
a second idle link member rotatably connected to the base part;
a second driving link member rotatably coupled to the second idle link member so as to intersect the second idle link member and having one end rotatably connected to the rectilinearly movable member; and
a second support link member connected to any one of the second idle link member and the second driving link member and configured to support the second touch tip.

3. The system of claim 2, wherein the first link part further comprises a first connection link member having one end connected to the other of the first idle link member and the first driving link member, and the other end connected to the first support link member, and
wherein the second link part further comprises a second connection link member having one end connected to the other of the second idle link member and the second driving link member, and the other end connected to the second support link member.

4. The system of claim 2, comprising:
a sliding rail provided on the base part and disposed in a rectilinear movement direction of the rectilinearly movable member; and
a sliding member connected to the rectilinearly movable member and configured to slide along the sliding rail,
wherein one end of the first driving link member is rotatably connected to the sliding member, and one end of the second driving link member is rotatably connected to the sliding member.

5. The system of claim 1, comprising a GUI test camera connected to the articulated robot and configured to capture an image of the GUI screen.

6. The system of claim 1, comprising:
a seating bed disposed in the GUI test chamber and configured to allow the vehicle display device to be seated thereon; and
a vibrator disposed in the GUI test chamber and configured to selectively apply vibration to the seating bed.

7. The system of claim 6, wherein the vibrator comprises:
a vibration motor disposed in the GUI test chamber;
a rotary member configured to be rotated by the vibration motor; and
a conversion member having one end rotatably connected to the rotary member and spaced apart from a rotation center of the rotary member, and the other end rotatably connected to the seating bed, the conversion member being configured to convert a rotation of the rotary member into a reciprocating rectilinear movement of the seating bed.

8. The system of claim 7, comprising:
a guide rail disposed in the GUI test chamber,
wherein the seating bed is configured to reciprocatingly and rectilinearly move along the guide rail.

9. The system of claim 6, comprising:
a cover member disposed in the GUI test chamber and configured to cover the vibrator.

10. The system of claim 6, comprising:
a clamp disposed on the seating bed and configured to selectively lock the vehicle display device to the seating bed.

11. The system of claim 10, wherein the clamp comprises:
a first clamping member disposed on the seating bed; and
a second clamping member disposed on the seating bed and configured to approach and move away from the first clamping member, and
wherein the vehicle display device is locked between the first clamping member and the second clamping member.

12. A system for evaluating a built-in video recording device for a vehicle, the system comprising:
a graphical user interface (GUI) test part configured to automatically perform evaluation of a GUI screen of a vehicle display device that operates in conjunction with the built-in video recording device for a vehicle;
an automatic evaluating part configured to automatically evaluate performance of the built-in video recording device for a vehicle based on a result evaluated by the GUI test part;
a camera test part configured to evaluate performance of a front camera of the vehicle or performance of a rear camera of the vehicle,
wherein the automatic evaluating part automatically evaluates performance of the built-in video recording device for a vehicle in cooperation with the camera test part,
wherein the camera test part comprises:
a camera test chamber having an accommodation space therein;
a camera mount disposed in the camera test chamber and configured to support the front camera or the rear camera;
an inner display part disposed inside the camera test chamber and configured to output video data; and
an outer display part disposed outside the camera test chamber and configured to output the video data,
wherein the camera mount comprises:
a mount main body:
a tilting mount configured to be tilted with respect to the mount main body;
a camera clamp disposed on the tilting mount and configured to selectively lock the front camera or the rear camera; and
a tilting stage configured to be tilted with respect to the tilting mount,
wherein the camera clamp is disposed on the tilting stage.

13. The system of claim 12, comprising:
a comparative camera clamp connected to the mount main body and configured to support a comparative camera.

* * * * *